(12) United States Patent
Jitsukawa

(10) Patent No.: US 10,153,929 B2
(45) Date of Patent: Dec. 11, 2018

(54) TRANSMISSION DEVICE, RECEPTION DEVICE, TRANSMISSION METHOD, AND RECEPTION METHOD

(71) Applicant: FUJITSU LIMITED, Kawasaki-shi, Kanagawa (JP)

(72) Inventor: Daisuke Jitsukawa, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/959,095

(22) Filed: Dec. 4, 2015

(65) Prior Publication Data

US 2016/0094372 A1 Mar. 31, 2016

Related U.S. Application Data

(63) Continuation of application No. PCT/JP2013/003903, filed on Jun. 21, 2013.

(51) Int. Cl.
| | |
|---|---|
| *H04L 27/22* | (2006.01) |
| *H04L 27/20* | (2006.01) |
| *H04L 5/00* | (2006.01) |
| *H04L 25/02* | (2006.01) |
| *H04L 27/26* | (2006.01) |
| *H04L 27/36* | (2006.01) |
| *H04L 27/38* | (2006.01) |

(52) U.S. Cl.
CPC ........ *H04L 27/2053* (2013.01); *H04L 5/0051* (2013.01); *H04L 5/0092* (2013.01); *H04L 25/022* (2013.01); *H04L 25/0226* (2013.01); *H04L 27/22* (2013.01); *H04L 27/2613* (2013.01); *H04L 27/362* (2013.01); *H04L 27/38* (2013.01)

(58) Field of Classification Search
CPC . H04L 1/0038; H04L 27/2053; H04L 5/0051; H04L 27/22; H04L 23/00
See application file for complete search history.

(56) References Cited

U.S. PATENT DOCUMENTS

| | | | |
|---|---|---|---|
| 8,867,642 B1 * | 10/2014 | Syed | H04L 69/22 375/260 |
| 2007/0242764 A1 | 10/2007 | Anigstein et al. | |

(Continued)

FOREIGN PATENT DOCUMENTS

| | | |
|---|---|---|
| CN | 102449920 A | 5/2012 |
| EP | 2 843 983 A1 | 3/2015 |

(Continued)

OTHER PUBLICATIONS

Extended European search report with the supplementary European search report and the European search opinion issued for corresponding European Patent Application No. 13887080.3 dated May 20, 2016.

(Continued)

*Primary Examiner* — Jaison Joseph
(74) *Attorney, Agent, or Firm* — Myers Wolin, LLC

(57) ABSTRACT

A transmission device including: a memory, and a processor coupled to the memory and configured to, when data is transmitted to a reception device, transmit a first signal that includes the data and a second signal generated by performing, based on identification information of the reception device, phase modulation on a known signal.

14 Claims, 12 Drawing Sheets

(56) References Cited

U.S. PATENT DOCUMENTS

| | | | |
|---|---|---|---|
| 2009/0122694 A1* | 5/2009 | Stephens | H04L 27/20 370/210 |
| 2010/0238873 A1* | 9/2010 | Asanuma | H04L 5/0007 370/329 |
| 2010/0285810 A1 | 11/2010 | Ko et al. | |
| 2010/0309861 A1 | 12/2010 | Gorokhov et al. | |
| 2011/0096685 A1* | 4/2011 | Lee | H04L 27/0012 370/252 |
| 2012/0219089 A1* | 8/2012 | Murakami | H04L 25/0222 375/296 |
| 2014/0241199 A1* | 8/2014 | Chun | H04L 5/0035 370/252 |
| 2015/0139205 A1* | 5/2015 | Kenney | H04W 52/241 370/338 |

FOREIGN PATENT DOCUMENTS

| | | |
|---|---|---|
| JP | 07-212429 A | 8/1995 |
| JP | 2009-533981 A | 9/2009 |
| JP | 2013-232766 A | 11/2013 |
| WO | 2010/082756 A2 | 7/2010 |
| WO | 2013/048192 A1 | 4/2013 |

OTHER PUBLICATIONS

3GPP TS 36.211 V11.2.0, "3rd Generation Partnership Project; Technical Specification Group Radio Access Network; Evolved Universal Terrestrial Radio Access (E-UTRA); Physical Channels and Modulation (Release 11)", Feb. 2013.

3GPP TS 36.212 V11.2.0, "3rd Generation Partnership Project; Technical Specification Group Radio Access Network; Evolved Universal Terrestrial Radio Access (E-UTRA); Multiplexing and channel coding (Release 11)", Feb. 2013.

3GPP TS 36.213 V11.2.0, "3rd Generation Partnership Project; Technical Specification Group Radio Access Network; Evolved Universal Terrestrial Radio Access (E-UTRA); Physical layer procedures (Release 11)", Feb. 2013.

3GPP TS 36.321 V11.2.0, "3rd Generation Partnership Project; Technical Specification Group Radio Access Network; Evolved Universal Terrestrial Radio Access (E-UTRA); Medium Access Control (MAC) protocol specification (Release 11)", Mar. 2013.

3GPP TS 36.331 V11.3.0, "3rd Generation Partnership Project; Technical Specification Group Radio Access Network; Evolved Universal Terrestrial Radio Access (E-UTRA); Radio Resource Control (RRC); Protocol specification (Release 11)", Mar. 2013.

3GPP TR 22.803 V12.1.0, "3rd Generation Partnership Project; Technical Specification Group Services and System Aspects; Feasibility study for Proximity Services (ProSe) (Release 12)", Mar. 2013.

International Search Report issued for corresponding International Patent Application No. PCT/JP2013/003903, dated Jul. 30, 2013, with an English translation.

Notice of Preliminary Rejection issued by the Korean Intellectual Property Office for corresponding Korean Patent Application No. 10-2015-7035489, dated Feb. 24, 2017, with English translation.

Notice of Reasons for Refusal issued by the Japan Patent Office for corresponding Japanese Patent Application No. 2015-522268, dated Mar. 14, 2017, with an English translation.

Office Action issued for corresponding Chinese Patent Application No. 201380077542.2 dated Feb. 26, 2018 with an English Translation.

Notice of Final Rejection issued by the Korean Intellectual Property Office for corresponding Korean Patent Application No. 10-2015-7035489, dated Oct. 25, 2017, with English translation.

Second Notification of Office Action issued by the State Intellectual Property Office of China for corresponding Chinese Patent Application No. 201380077542.2, dated Sep. 29, 2018, with an English Translation.

* cited by examiner

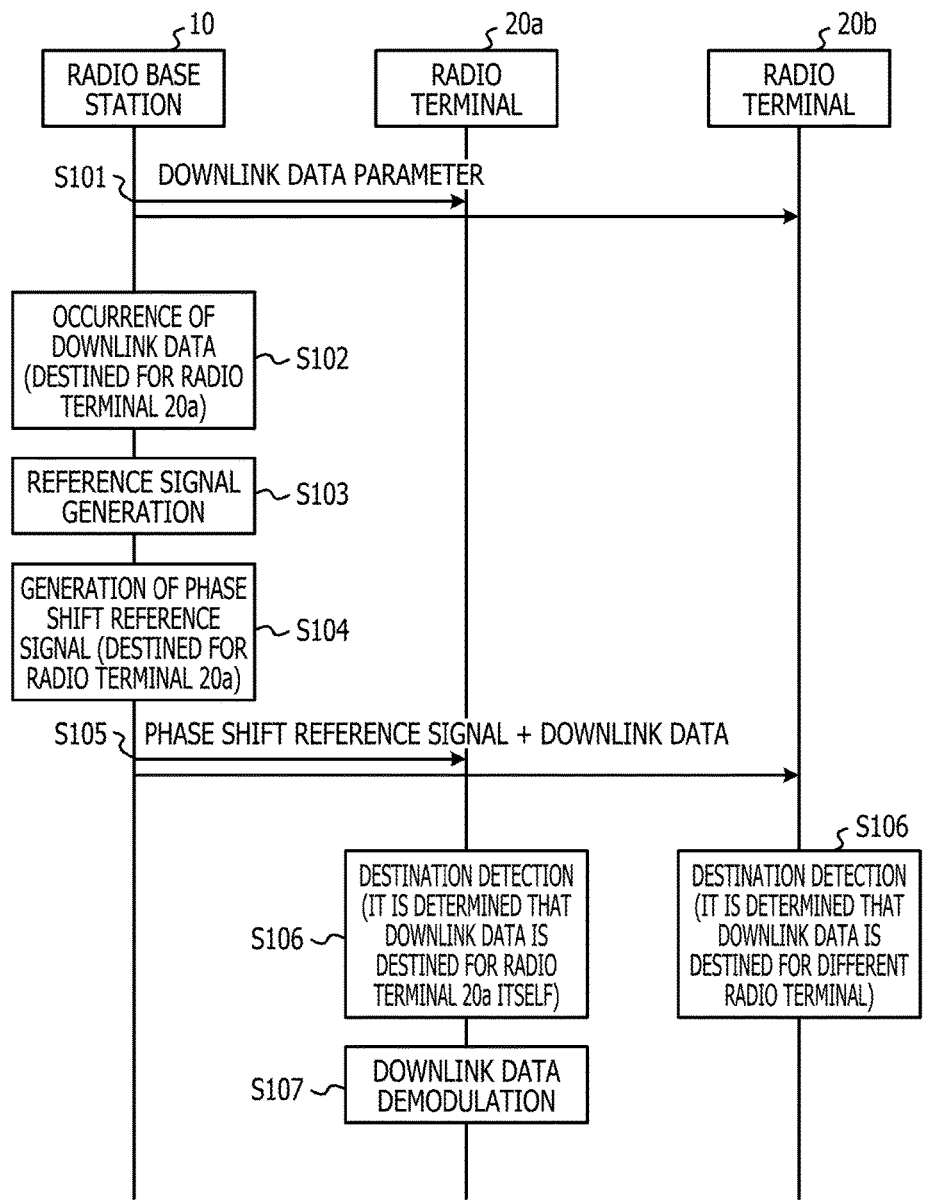

TRANSMISSION DEVICE, RECEPTION DEVICE, TRANSMISSION METHOD, AND RECEPTION METHOD

CROSS-REFERENCE TO RELATED APPLICATION

This application is a continuation application of International Application PCT/JP2013/003903 filed on Jun. 21, 2013 and designated the U.S., the entire contents of which are incorporated herein by reference.

FIELD

The present invention relates to a transmission device, a reception device, a transmission method, and a reception method.

BACKGROUND

In recent years, a discussion on next generation radio communication technologies has been performed to further enhance high-speed, high-capacity radio communication, and the like in a radio communication system such as a portable phone system (cellular system). For example, a communication standard referred to as Long Term Evolution (LTE) and a communication standard referred to as LTE-Advanced (LTE-A) that is based on an LTE radio communication technology have been proposed by 3rd Generation Partnership Project (3GPP) for standardization.

A communication standard recently completed in 3GPP is Release 10 corresponding to LTE-A, in which Release 8 and Release 9 that correspond to LTE are greatly enhanced functionally. At present, a discussion on a main portion of Release 11 that is a further extension of Release 10 has been finished, and details are going to be discussed toward completion of Release 11. In addition, a discussion on Release 12 has started. "LTE" is hereinafter defined as including LTE and LTE-A, and other radio communication systems that are extension of those, unless otherwise specified.

Various technologies are included in 3GPP Release 11, and among them is machine type communication (MTC). MTC is equivalent to so-called machine-to-machine (M2M) communication in 3GPP, and indicates a type of communication in which machines exchange information without a human being involved. Note that the term device-to-device (D2D) communication is used in 3GPP in some cases, and this also indicates the same concept as that of MTC or M2M communication. Moreover, in 3GPP, broad concepts, such as short-distance communication between radio terminals, and services or applications relating to this short-distance communication, are referred to as proximity services (ProSe).

Specific application examples of MTC include monitoring of meters, such as an electricity meter, a gas meter, and a water meter, security monitoring, monitoring of various apparatuses, a sensor network, and the like. Furthermore, it is also assumed that, for example, electric appliances and the like within a house may support MTC, and thus the electric appliances operate in conjunction with each another. A discussion on MTC has lately started in 3GPP, but because it is considered that MTC has applications in many fields, it is expected that the discussion on MTC as a promising technology will continue actively in 3GPP.

CITATION LIST

Non Patent Literature

NPL 1: 3GPP TS36.211 V11.2.0 (2013-02)
NPL 2: 3GPP TS36.212 V11.2.0 (2013-02)
NPL 3: 3GPP TS36.213 V11.2.0 (2013-02)
NPL 4: 3GPP TS36.321 V11.2.0 (2013-03)
NPL 5: 3GPP TS36.331 V11.3.0 (2013-03)
NPL 6: 3GPP TR22.803 V12.1.0 (2013-03)

SUMMARY

According to an aspect of the invention, a transmission device comprising: a memory, and a processor coupled to the memory and configured to, when data is transmitted to a reception device, transmit a first signal that includes the data and a second signal generated by performing, based on identification information of the reception device, phase modulation on a known signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating one example of a sequence of transmission and reception of downlink data according to a first embodiment of the present application.

DESCRIPTION OF EMBODIMENTS

Figure 2A:
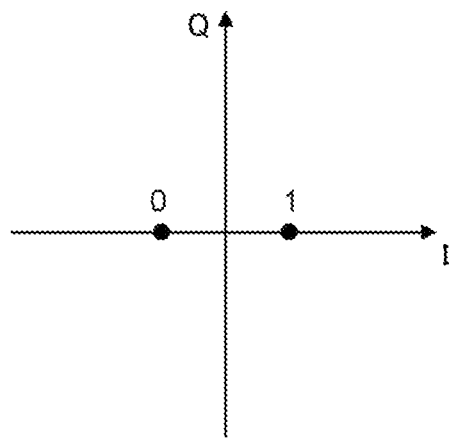
FIGS. 2A, 2B and 2C are diagrams for describing a phase modulation scheme.

Various devices that support MTC are generally called MTC devices, and it is considered that MTC devices have several different features as compared to typical portable telephone terminals (so-called cellular terminals). For example, generally, it is assumed that with respect to MTC devices the number of terminals becomes more enormous than normal cellular terminals. For MTC devices, there is a demand to discuss a change (such as extension or simplification) of various control operations or processes that are applied to typical portable telephone terminals, as desired, based on these difference in features. This is because it is considered that, when various control operations or processes that are applied to a typical portable telephone terminal are applied, without any change, to MTC device, there is a case where an adverse effect occurs to a system operation of a radio system that handles the MTC device (for example, a large number of MTC devices access a radio base station within the radio system at the same time and thus too excessive a load is applied, or radio resources for transmission of data to a large number of MTC devices or transmission of data from the large number of MTC devices are highly insufficient), or where functional redundancy is present.

However, the discussion on MTC devices has just started, and the fact is such that only a small number of studies have been conducted on the various control operations and processes that are based on the features of MTC. Particularly, one aspect is that studies on a scheduling scheme that is based on the features of MTC have barely progressed. Several scheduling schemes are already defined in a current LTE system. However, when consideration is given based on current or future diversification of a utility form including MTC devices of the portable telephone terminal, there is a possibility that these schemes may be insufficient in efficiency.

Moreover, a description with respect to the problems described above is given based on MTC devices in the LTE system, but the problems occur in typical portable telephone terminals as well. Several scheduling schemes are already defined in the current LTE system. However, when consideration is given based on current and future changes in the utility form of the portable telephone terminal, there is a concern that these schemes may be insufficient in efficiency.

Disclosed is a technique that addresses the problems described above, and provided are a transmission device, a reception device, a transmission method, and a reception method, in which efficient scheduling is performed based on current and future diversification in a utility form of a portable telephone terminal.

Referring to the drawings, embodiments of a transmission device, a reception device, a transmission method, and a reception method according to the disclosure will be described below. In addition, for convenience, descriptions are provided for individual embodiments, but it goes without saying that combinations of the embodiments can bring out combined effects and an increase in utility.

[Problem Identification]

First, problems with techniques in the related art are described before each of the embodiments is described. The problems were found as a result of the inventor's close examination of the techniques in the related art, and it is noted that the problems had not been known before.

As described above, several scheduling schemes are already defined in the current LTE system. However, when consideration is given based on current and future diversification in a utility form including an MTC device of a portable telephone radio terminal, there is a possibility that these may be insufficient in efficiency. For discussion from this point of view, dynamic scheduling that is a normal scheduling scheme which is defined in an LTE system, and semi-persistent scheduling (SPS) that is a scheduling scheme which is used in a predetermined case will be described below in this order. In addition, downlink data communication in which data is transmitted from a radio base station to a radio terminal will be described below as an example, but it is noted that uplink data communication in which the data is transmitted from the radio terminal to the radio base station can be described in the same manner.

The dynamic scheduling that is a normal scheduling scheme in LTE will be described. Here, as an example, the dynamic scheduling for the downlink data communication is described.

In the dynamic scheduling, in a case where the radio base station transmits downlink data to the radio terminal, scheduling is dynamically performed. Then, based on a result of the scheduling, the radio base station transmits data to the radio terminal, in a state of being mapped to a downlink radio frame. At this time, the radio base station transmits control information, which is added to the data, to the radio terminal, in a state of being mapped to the same subframe (1 millisecond) as with the data. In the dynamic scheduling, because arrangement of the data on the subframe changes each time, or a data modulation scheme and a coding scheme change each time, the radio base station notifies the radio terminal of these changes, in a state of being stored as parameters in the control information.

The control information added to the data is called downlink control information (DCI). The DCI is a layer 1 (L1) control signal, and is transmitted over a physical downlink control channel (PDCCH). As described above, included in the DCI is a resource allocation that is information indicating the arrangement of the data on the subframe (a radio resource allocated to the data in the subframe), or a modulation and coding scheme (MCS) that is information indicating the data modulation scheme and the data coding schemes. In addition, in the LTE system, because a unit on a time axis for data transmission is determined as one subframe, only a frequency component is allocated in a unit called a resource block, for the resource allocation.

A cyclic redundancy check (CRC) is added to the DCI, and the CRC is masked (scrambled) with an RNTI that is an identifier of the radio terminal. The radio terminal monitors the PDCCH of each subframe, and performs checking of the CRC that is added to the DCI, using its own RNTI. Here, when the checking of the CRC succeeds, the radio terminal determines that the DCI to which the CRC is added is destined for the radio terminal itself. On the other hand, when the checking of the CRC fails, the radio terminal determines that the DCI to which the CRC is added is destined for other than the radio terminal itself. Because the DCI is the control information added to the data, this determination of the destination of the DCI is also determination of the destination of the data. When the DCI that is destined for the radio terminal itself is detected, it is determined that the data with the DCI is destined for the radio terminal itself, and the data that is destined for the radio terminal itself is obtained by performing demodulation and decoding based on the resource allocation or the MCS that is included in the DCI.

As described above, the radio terminal determines whether or not the data is destined for the radio terminal itself based on the DCI. Furthermore, based on the DCI, the radio terminal can perform extraction of the data from a downlink subframe, and can perform the demodulation and the decoding. Therefore, it can be said that in the dynamic scheduling, it is indispensable for the DCI to be added to each data.

With the dynamic scheduling, because the radio base station can allocate as many radio resources as is desired to the radio terminal when desired, an efficient radio communication system can be realized. However, in the dynamic scheduling, the radio base station is requested to cause a control signal (the DCI) to be added to the data each time when transmitting the data. Accordingly, several problems occur as follows.

The first problem that results from the control signal being added to the data is that data transfer efficiency decreases. Because the radio resource is limited, the data is difficult to be transmitted in the radio resource for sending the control signal. Therefore, the greater the number of control signals, the more the radio resource that can be used for data transmission is decreased and finally, the data transfer efficiency decreases. Because in the dynamic scheduling, the control signal is added to the data in a one-to-one corresponding manner, one aspect is that the data transfer efficiency is not sufficient.

The second problem that results from the control signal being added to the data is that there is an insufficient control signal region which is a region on the radio frame to which the DCI is mapped. The control signal region that is a region for mapping the DCI is determined as a maximum of three orthogonal frequency division multiplexing (OFDM) symbols from the head of each downlink subframe that constitutes the downlink radio frame. If the control signal region is increased to be equal to or greater than the three OFDM symbols, because compatibility to an old radio terminal (a radio terminal and the like that are supported up to and including only Release 8) is difficult to maintain, it is not realistic to change a limitation that is the maximum of three OFDM symbols. However, because of this limitation, in a case where the amount of data to transmit is large and so forth, there is an insufficient control signal region. In the dynamic scheduling, when the radio base station transmits data, the DCI is desired to be added to the data.

Therefore, with the dynamic scheduling in the LTE system, the control signal (DCI) is added to the data in a one-to-one corresponding manner. Accordingly, a problem occurs in which the data transfer efficiency decreases or the control signal region is insufficient.

The problem in which the data transfer efficiency decreases or the control signal region is not sufficient results from the control signal being added to the data in a one-to-one corresponding manner. Therefore, it is considered that in order to avoid the problem, an improvement in control signal transfer efficiency, particularly, a reduction in the number of control signals is effective. In contrast, with SPS that is one scheduling scheme which is defined in the LTE system, the number of control signals can be decreased.

In the SPS, the radio resource is not only allocated dynamically each time as in the dynamic scheduling, but the radio resource is also allocated in a semi-persistent, periodic manner using one piece of DCI. Accordingly, with the SPS, the radio base station can perform periodic data communication with the radio terminal without causing control information for scheduling to be added to the data each time. The SPS is typically applied to voice communication, but it is also possible to apply the SPS to the data communication by the MTC device and the like.

An SPS operation is described. When performing the SPS, the radio base station notifies the radio terminal of a data transmission (reception) period and the like in advance. This notification is realized with an RRC signal that is a higher-layer control signal. Thereafter, in a case where the SPS is started for a radio terminal, the radio base station transmits a control signal for activating the SPS for the radio terminal. This control signal is realized with the DCI described above. Like in a case of the dynamic scheduling, the resource allocation or the MCS is also included in the DCI at this time. In the subframe in which the DCI is transmitted, the radio base station transmits the first data in periodic data transmission, in a state of being mapped to the subframe in which the DCI is transmitted, using the resource allocation or the MCS that is designated with the DCI.

Like in the case of the dynamic scheduling, when the checking of the CRC that is added to the DCI succeeds, the radio terminal determines that the DCI is destined for the radio terminal itself. Then, the data (the first data in the periodic data transmission) with the DCI is received (demodulated and decoded) based on the DCI. Furthermore, the radio terminal recognizes that the SPS is activated, based on the DCI. By doing this, subsequently, the radio terminal receives (demodulates and decodes) the data periodically based on the period that is notified in advance from the radio base station.

The radio base station does not cause the DCI to be added to the second or later data in the periodic data transmission for the SPS. However, it is also possible for the radio terminal to receive the second or later data without any problem. Specifically, in the SPS, a reception timing of the data is determined based on a reception timing of the DCI that notifies the activation, and the period that is notified in advance. Accordingly, the radio terminal can recognize the reception timing of the second or later data. Furthermore, in the SPS, the same resource allocation or the MCS is also applied to the second or later data in the periodic data transmission as is the case with the first data. Accordingly, the radio terminal can perform the demodulation and the decoding of the second or later data. Therefore, the DCI is not added to the second or later data in the SPS, but it is possible for the radio terminal to receive the second or later data.

With the SPS described above, the control signal (DCI) is not added to the data in a one-to-one corresponding manner, when compared with the dynamic scheduling. Accordingly, it is thought that the problem in which the data transfer efficiency decreases or the control signal region is insufficient, which are described above, is solved to some extent.

However, a case is considered in which although the SPS is used, the problems described above that arise from the DCI are not necessarily sufficiently solved. Specifically, with the SPS described above, periodic data transmission is forced to perform based on the period that is set up in advance. In other words, with the SPS, it is difficult for the radio base station to perform the data transmission to the radio terminal at an arbitrary timing. It can be said that the SPS has a low degree of freedom for the timing of the data transmission.

Accordingly, for example, in a case where the downlink data that is destined for the radio terminal occurs in the radio base station, in the SPS, the data has to wait to be transmitted at least until the next transmission timing in periodic transmission. Accordingly, transmission delay occurs to the downlink data. Particularly in a case where the downlink data occurs in a bursty manner, it is considered that an amount of delay increases cumulatively in the SPS in which the transmission is performed only at a periodic timing.

In order to avoid the transmission delay that is based on the SPS, the radio base station is requested to transmit the data in the dynamic scheduling. However, the DCI is desired each time the data is transmitted in the dynamic scheduling. Therefore, in such a case, it is considered that the problems described above that arise from the DCI are not sufficiently solved.

Furthermore, the SPS corresponds to only the first transmission (new data transmission) of the data at each period. In other words, also in the SPS, the dynamic scheduling is desired to be performed at the time of data retransmission. However, the DCI is desired each time the data is transmitted in the dynamic scheduling. Therefore, it is considered that also in such a case, the problems described above that arise from the DCI are not sufficiently solved.

As described above, there is a case where although the SPS is used, the problems described above that arise from the DCI are not necessarily sufficiently solved. Accordingly, it is considered that a new scheduling scheme that can solve these problems is preferably defined.

Then, the following scheme (which is referred to as a "reference scheme" for convenience) is considered. First, the radio base station notifies the radio terminal of information that is used for the data transmission, such as the resource allocation or the MCS. The information that is notified at this point may include arbitrary information that is included in the DCI in normal dynamic scheduling. The notification, for example, may be realized as the RRC signal that is an L3 control signal, and may be set to be realized by enhancing normal DCI that is an L1 control signal.

In the reference scheme, the radio base station is set to be able to transmit data to the radio terminal using an arbitrary subframe after the notification described above. However, the radio base station sets the DCI not to be added to the data when transmitting the data. Instead, when transmitting the data, the radio base station is set to encode and modulate the data based on the MCS that is notified in advance, and to arrange the data based on the resource allocation that is notified in advance. With the reference scheme, it is possible for the radio terminal to extract the data from the subframe and perform the demodulation and the decoding without the DCI being added to the data.

At this point, it is desirable that in the reference scheme, the radio resource that is shared among multiple radio terminals is allocated. In other words, it is desirable that the radio resource is allocated to a radio terminal group to which multiple radio terminals belong.

In the reference scheme, certain radio resources are continuously allocated in advance to the radio terminal during a period of time or until a predetermined event (a termination notification and the like by the radio base station) occurs. In the reference scheme, if a certain radio resource is allocated to only one radio terminal, the allocated radio resource serves no purpose (a loss of the radio resource occurs) in the subframe with which the data transmission to the radio terminal is not performed. In this case, because the frequency with which the data transmission to the one radio terminal is performed is not very high (for example, approximately one subframe, among 20 subframes, is said to be used even during a VoIP conversation section), usage efficiency of the radio frequency is considerably low. In order to avoid this, it is considered that the radio resource is desirably allocated to the radio terminal group to which the multiple radio terminals belong.

In addition, in a case where the radio resource is allocated to the radio terminal group, it is desirable that the multiple radio terminals that belong to the radio terminal group have similar characters. For example, it is considered that the radio terminals that are similar in the frequency with which the data is received or in the size of the data to receive are set to be in the same group. Furthermore, it is considered that the radio terminals in the similar environment are set to be in the same group.

At this point, it is considered that the MTC device described above has comparatively-good compatibility with the reference scheme. One of the reasons for this is because in most cases, the MTC device is not on the move (is in a semi-stationary state), it is difficult for a radio environment (a channel characteristic) to change, and thus there is almost no desire to dynamically change the MCS and the resource allocation. Furthermore, because the same types of MTC devices are similar in the frequency with which the data is received, or in the size of the data to receive, the grouping is easy to perform. In addition, this is because it is assumed that the number of MTC devices is great and additionally, it is considered that in most cases, an amount of reception data is comparatively small, and because it is considered that the desire to reduce the number of control signals is higher than usual in the radio terminals.

However, a remaining problem with the reference scheme is that the radio terminal side does not know which radio terminal the data at the radio terminal side is destined for (whether or not the data is destined for the radio terminal itself). This is because in the dynamic scheduling in the related art, a destination of the data is determined based on the CRC that is added to the DCI, but it is assumed that in the reference scheme, the DCI is not added to the data. In order to put the reference scheme to practical use, it is considered that these problems is desired to be solved.

Moreover, although the description is provided above partly based on the MTC device as an example, the problems described above are not necessarily limited to the MTC device. It is considered that the problems described above, for example, occur to a normal portable telephone radio terminal that is used in the same manner or in a similar manner as the MTC device.

In summary, there is a desire to keep the data transfer efficiency and the control signal region from decreasing and lacking, respectively, by reducing the number of control signals in the MTC device or the like. Accordingly, the dynamic scheduling or the SPS is not sufficient in the LTE system in the related art, and the reference scheme (which is described above) is considered in which the data is transmitted with the radio resources that are continuously allocated in advance without the control information being added to the data. However, with the reference scheme, it is difficult to recognize the destination of the data that is received by the receiving side. The problems that are described above were newly found as a result of the inventor making a close examination of techniques in the related art, and have not been known in the related art. Embodiments in the present application for solving the problems described above are hereinafter described.

First Embodiment

According to a first embodiment, a phase shift reference signal that results from phase-shifting a reference signal according to an identifier of the receiving side (the radio terminal side) is used, and thus the receiving side is set to be able to detect a transmission destination (a destination) based on the phase shift reference signal.

In other words, according to the first embodiment, a transmission device is realized that includes a transmission section that, in a case where data is transmitted to a reception device, transmits a first signal including the data and a second signal that results from performing phase modulation on a known signal based on identification information of the reception device. Furthermore, a reception device is realized that includes a reception section that receives a first signal and a second signal, and that determines that the first signal is destined for the reception device in a case where the second signal is a signal that results from performing phase modulation on a known signal based on identification information of the reception device.

FIG. 1 is a diagram illustrating one example of a processing sequence of a radio communication system according to the first embodiment.

First, an assumption about FIG. 1 is described. One example, a radio base station 10 and two radio terminals 20a and 20b appear in FIG. 1. The two radio terminals 20a and 20b are hereinafter collectively referred to as a radio terminal 20 unless otherwise specified.

The radio terminals 20a and 20b are set to belong to the same radio terminal group. At this point, a radio terminal group can be set up according to an arbitrary reference, but it is desirable that the radio terminal 20 having any similar character is set to be in the same radio terminal. For example, the radio terminal group into which the radio terminal 20 having the same type of radio terminal (a predetermined MTC device and the like) is arranged can be set up, or the radio terminal group into which the radio terminal 20 having a similar radio environment (channel characteristic) is arranged can be set up.

FIG. 1 is a processing sequence in a case where downlink data is transmitted from the radio base station 10 to the radio terminal 20a. Moreover, according to the first embodiment, as one example, the invention in the present application is also applied to the LTE system. However, it is noted that the invention in the present application can be applied in the same manner to an arbitrary radio communication system other than the LTE system.

Furthermore, the problems and the like have been described so far with the focus being placed mainly on the MTC device in the LTE system in the present application, but as described above, the invention in the present application is not necessarily limited to the MTC device. It is considered that the problems described above, for example, occur to a normal portable telephone radio terminal 20 that is used in the same manner or in a similar manner as the MTC device. Accordingly, a description is hereinafter provided based on the radio terminal 20 that is equivalent to a generic concept of the MTC device. Unless otherwise specified, the radio terminal 20 that is described, when read, may be suitably replaced with the MTC device.

The radio base station 10 in S101 in FIG. 1 transmits various parameters desired for reception of the downlink to the radio terminal 20 (notifies the radio terminal 20 of the various parameters). On the other hand, the radio terminal 20 receives the various parameters desired for the reception of the downlink data from the radio base station 10. The various parameters that are transmitted and received in S101 are called parameters for downlink data for convenience.

The transmission of the parameters for downlink data can be realized by multicasting or broadcasting to multiple radio terminals 20 under the control of the radio base station 10. For example, the multicasting may be performed on a predetermined radio terminal 20 that belongs to a predetermined group of radio terminals 20. The transmission of the parameters for downlink data can be realized by the RRC signal that is a higher-layer (L3) control signal which is transmitted over a physical downlink shared channel (PDSCH) and can be realized by the DCI that is a lower-layer (L1) control signal that is transmitted over a physical downlink control channel (PDCCH).

The parameters for downlink data may include an arbitrary parameter desired for the reception of the downlink, and can include arbitrary information that is included in the DCI in normal dynamic scheduling. For example, the resource allocation or the MCS, which is described above, can be included in the parameters for downlink data. The resource allocation can be performed based on the resource block that is a unit of frequency allocation in the LTE system. Furthermore, the parameters for downlink data may include arbitrary parameters other than these.

According to the present embodiment, with the transmission and reception of the parameters for downlink data in S101 as a trigger, the radio base station 10 is set to be able to transmit the downlink data to the radio terminal 20 using a method that will be described below. However, starting timing (a trigger) of a period of time during which the transmission and reception of the downlink data is possible may be transmitted from the radio base station 10 to the radio terminal 20, at a time of the transmission and reception of the parameters for downlink data in S101 or using a signal separately from the parameters for downlink data. Furthermore, ending timing of the period of time during which the transmission and reception of the downlink data is possible may be transmitted from the radio base station 10 to the radio terminal 20, at the time of the transmission and reception of the parameters for downlink data in S101 or using the signal separately from the parameters for downlink data.

In S102 in FIG. 1, the downlink data that is data destined for the radio terminal 20a in the radio base station 10 occurs. The downlink data occurs in a case where a different radio terminal 20b and the radio terminal 20a perform telephone communication with each other, in a case where the radio terminal 20a receives a Web page or a mail from a server and the like on a network, or the like.

Although not illustrated in FIG. 1, in a case where downlink data occurs, the radio base station 10 performs scheduling for transmitting the downlink data, and determines a timing (a subframe) with which the downlink data is transmitted. The determination of the timing may be performed based on conditions of other downlink data, or in order of priority that is set to each of downlink data. Various schemes are considered for this, but descriptions thereof are omitted because any arbitrary technique that is applied serves the purpose.

However, one aspect to emphasize is that according to the present embodiment, for example, after the transmission and reception of the parameters for downlink data in S101, the radio base station 10 can transmit the downlink data to the radio terminal 20 at an arbitrary timing (subframe). Consequently, scheduling of the downlink data, as is the case with the SPS described above, is not subject to a timing of periodic transmission. This is one advantage in a case where the present embodiment is compared with the SPS.

Next, the radio base station 10 generates a reference signal in S103 in FIG. 1. The reference signal is one type of known signal, and is called a standard signal, a pilot signal, or the like. There are several types of reference signals, but it can be said that the reference signal is a signal that is used for channel estimation (which is also called synchronization detection), demodulation of receiving data, quality measurement, or the like and that is indispensable for the receiving side (the radio terminal 20 in the case of the present embodiment) to receive the data.

As the reference signal in the LTE system, there are a cell-specific reference signal, a user equipment (UE)-specific reference signal, a channel state information (CSI) reference signal, and the like. The cell-specific reference signal has been used since an early LTE system (Release 8) and is a known signal that is based on a cell-specific identifier. Accordingly, the term cell-specific reference signal is coined. The cell-specific reference signal is a general-purpose reference signal, and is widely used for the channel estimation, the demodulation of the reception data, the quality measurement or the like.

In contrast, the UE-specific reference signal and the channel state information reference signal are comparatively new reference signals that are adopted in Release 10. The UE-specific reference signal is a known signal that is based on an identifier of the radio terminal (which may also be referred to as a user equipment identifier). Accordingly, the term UE-specific reference signal is coined. As the identifier of the radio terminal here, a radio network temporary ID (RNTI) is used that is a logical identifier which is temporarily allocated to the radio terminal 20 in the LTE system. The UE-specific reference signal is a reference signal that is specially dedicated to the channel estimation or the data demodulation, and in a case where data is transmitted, is arranged, at a comparatively high density, only in a region (PDSCH) to which the data in a subframe is mapped. On the other hand, the channel state information reference signal is a reference signal that is specially dedicated to the quality measurement, and is transmitted at a comparatively long transmission period, in a state of being arranged over a frequency bandwidth that is occupied by the subframe. When 8 antenna multiple input multiple output (MIMO) transfer was adopted in Release 10, the cell-specific reference signal that is a general-purpose reference signal, or an enhanced version of the cell-specific reference signal was insufficient. Accordingly, as a reference signal for a new individual purpose, the UE-specific reference signal for the channel estimation and the data demodulation and the channel state information reference signal for the quality measurement were defined.

According to the present embodiment, unless otherwise specified, the "reference signal" is defined as indicating the UE-specific reference signal. This is because, as described below, according to the present embodiment, the reference signal is transmitted in a state of being phase-shifted based on a specific identifier of the radio terminal (RNTI), and because only a specific radio terminal 20 is desired to use the reference signal that is received. On the other hand, it is considered that because the cell-specific reference signal or the channel state information reference signal is received by all of the radio terminals 20 under the control of the radio base station 10, the cell-specific reference signal or the channel state information reference signal is not suitable for the present embodiment. Moreover, the invention in the present application is not limited to the UE-specific reference signal, and is applicable to an arbitrary reference signal that is received only by a specific user. Particularly, it is noted that the reference signal according to the invention in the present application, like the UE-specific reference signal, does not meet the requirement of being generated based on the identifier of the radio terminal and that although the reference signal does not depend on the user equipment, this does not pose any problem.

The radio base station 10 in Step S103 generates the reference signal (the UE-specific reference signal) using a predetermined rule that is based on the identifier (RNTI) of the radio terminal. As described above, the reference signal is a so-called known signal. This is because the receiving side (the radio terminal 20) also recognizes the identifier of the radio terminal and the predetermined rule in advance and thus can generate the reference signal. Because a specific procedure for generating the reference signal is only one in the related art, a description thereof is omitted here.

Next, in S104, the radio base station 10 generates the phase shift reference signal. The phase shift reference signal is a signal that results from phase-shifting the reference signal that is generated in S103, based on an identifier (RNTI) of the radio terminal 20a that is a destination of the downlink data that occurs in S102. At this point, the phase shift may also be referred to as shift rotation.

Generation of the phase shift reference signal will be described in detail below. First, in preparation for this, a digital modulation scheme (which is hereinafter briefly called a modulation scheme) is described. Here, quadrature phase shift keying (QPSK), as one example of the modulation scheme, which is one type of phase modulation is described. A degree of modulation of the QPSK is 2 (=$\log_2 4$). In other words, the QPSK is a modulation scheme that can propagate 2-bit information with one symbol. Moreover, the modulation scheme according to the present embodiment is not limited to the QPSK, and an arbitrary phase modulation scheme can be used. For example, binary phase shift keying (BPSK), octuplet phase shift keying (8 PSK), or the like can be used.

At this point, generally, it is considered that the digital modulation scheme is performed on a plane that is called an I-Q plane. At this point, I means an in-phase component, and Q means a quadrature component. When a reference signal (a frequency that serves as a reference) is determined, because an alternating current signal can be expressed with amplitude and a phase, the alternating current signal can be expressed with points on a plane.

Figure 2B:
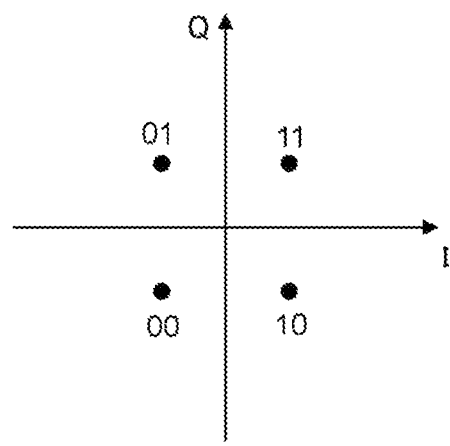
Figure 2C:
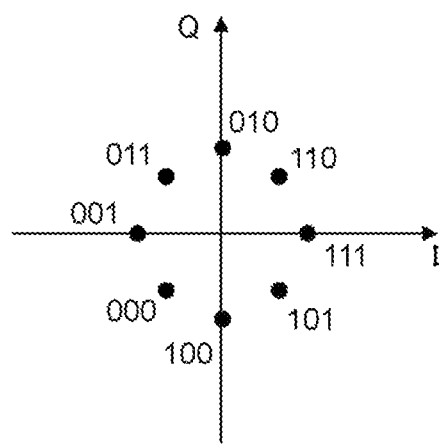

FIGS. 2A to 2C illustrate primary phase modulation schemes on the I-Q plane. FIGS. 2A to 2C illustrate the BPSK, the QPSK, and the 8 PSK, respectively. FIGS. 2A to 2C illustrate so-called constellation display of the modulation scheme.

A description is provided below referring to FIG. 2B illustrating the QPSK. As described above, each symbol in the QPSK is information for two bits, and four types of states are obtained. These four types of states are expressed with four signal points on the I-Q plane that is illustrated in FIG. 2B. The four signal points in the QPSK correspond to 00, 01, 10, and 11 that are values which can be obtained using two bits, respectively.

The four signal points in the QPSK that are illustrated in FIG. 2B are the same in amplitude and are different only in phase. Specifically, the signal point corresponding to 00 is 225° in phase, the signal point corresponding to 01 is 135° in phase, the signal point corresponding to 11 is 45° in phase, and the signal point corresponding to 10 is 315° in phase. For example, in a case where two-bit information 00 is transmitted using the QPSK, a signal that results from phase-shifting the reference signal by 135° is transmitted.

A description is provided referring back to FIG. 1. In S104, the radio base station 10 generates the phase shift reference signal by performing two-step processing. First, the radio base station 10 divides a bit string that corresponds to the identifier (RNTI) of the radio terminal which is a destination of the downlink data that occurs in S102, for every number of bits that is based on the degree of modulation of a predetermined modulation scheme. Accordingly, it is possible to covert the identifier of the radio terminal 20 into a symbol sequence in compliance with a predetermined modulation scheme. Next, the radio base station 10 phase-shifts the reference signal that is generated in S103, based on a phase that is retained by each symbol (which is equivalent to each signal point on the I-Q plane in the modulation scheme) which is included in the symbol sequence in compliance with the predetermined modulation scheme, which is previously generated. Accordingly, the radio base station 10 can generate the phase shift reference signal.

Processing in S104 will be described below based on a specified example. RNTI that is the identifier of the radio terminal in the LTE system is a 16-bit value. At this point, as one example, RNTI of the radio terminal 20a that is the destination of the downlink data that occurs in S102 is set to be 0001101110011100. Furthermore, as an example, the QPSK described above as a predetermined modulation scheme is described.

In this specific example, in S104, the radio base station 10 performs division of RNTI for every 2 bits. The number 2 in the 2 bits is the number of bits that is based on the degree of modulation of the QPSK. Accordingly, RNTI=0001101110011100 are divided into 8 bit strings, that is, 00, 01, 10, 11, 10, 01, 11, and 00. At this point, for convenience, the 8 bit strings are set to be called division RNTIs (furthermore, which may be more generally referred to as a division identifier of the radio terminal). With the division of RNTI into 8 pieces, it is possible to convert RNTI into a symbol sequence with a length of 8, in compliance with the QPSK.

In S104, next, the radio base station 10 phase-shifts the reference signal that is generated in S103, by an amount of phase that corresponds to each symbol which is included in the symbol sequence in compliance with QPSK, which is previously generated, and thus generates the phase shift reference signals of which the number is the same as the length of the symbol sequence.

Figure 3A:
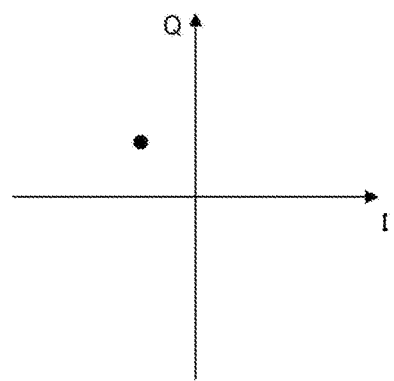
FIGS. 3A, 3B, 3C, 3D and 3E are diagrams for describing one example of a phase shift reference signal according to the first embodiment of the present application.
Figure 3B:
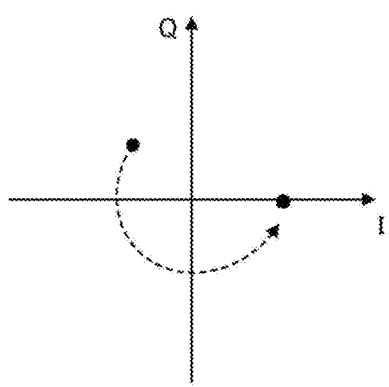
Figure 3C:
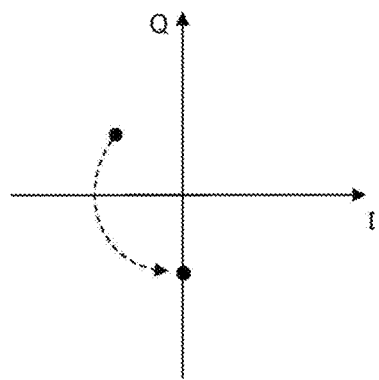
Figure 3D:
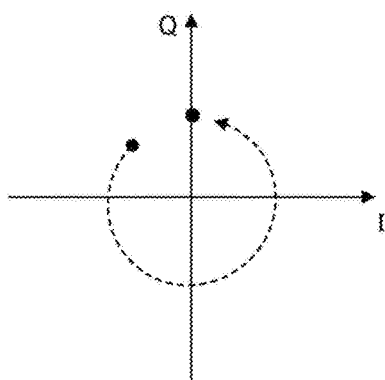
Figure 3E:
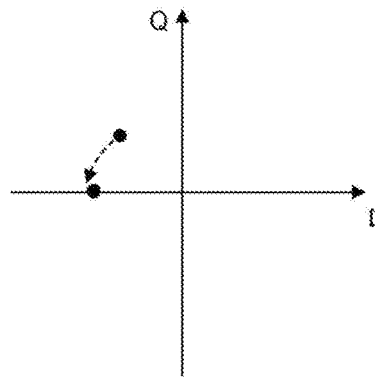

FIGS. 3A to 3E are diagrams for describing the phase shift of the reference signal. Now, as one example, the reference signal that has not yet experienced the phase shift is set to be a signal that is illustrated in FIG. 3A. At this time, a phase shift reference signal that corresponds to a QPSK symbol 00, as illustrated in FIG. 3B, is set to result from phase-shifting the reference signal by 225°. In the same manner, a phase shift reference signal that corresponds to a QPSK symbol 01, as illustrated in FIG. 3C, is set to result from phase-shifting the reference signal by 135°. A phase shift reference signal that corresponds to a QPSK symbol 10, as illustrated in FIG. 3D, is set to result from phase-shifting the reference signal by 315°. A phase shift reference signal that corresponds to a QPSK symbol 11, as illustrated in FIG. 3E, is set to result from phase-shifting the reference signal by 45°.

A description is provided with reference to the specific example described above. A 0-th phase shift reference signal is generated by phase-shifting the reference signal that is generated in S103, by an amount of QPSK phase which is equivalent to 00 that is a 0-th division RNTI, that is, by 225° (corresponding to FIG. 3B). A 1st phase shift reference signal is generated by phase-shifting the reference signal that is generated in S103, by an amount of QPSK phase which is equivalent to 01 that is a 1st division RNTI, that is, by 135° (corresponding to FIG. 3C). Thereafter, in the same manner, the radio base station 10 can also generate a total of 8 phase shift reference signals up to and including a 7th division RNTI. Moreover, it is noted that in the present application, in a case where N elements (which are arbitrary) are present, according to a usual practice in the radio communication field, the N elements are described as being sequentially numbered from 0-th to (N−1)-th (are given indexes, respectively).

As described above, in S104, the radio base station 10 can phase-shift the reference signal that is generated in S103 based on the identifier (RNTI) of the radio terminal and thus can generate the phase shift reference signal.

Next, in S105, the radio base station 10 transmits the phase shift reference signal that is generated in S104, to the radio terminal 20. The phase shift reference signal is transmitted in a state of being mapped to a predetermined radio resource in the downlink radio frame. For example, the UE-specific reference signal in the LTE is mapped using one or several of the radio resources (resource elements that will be described below) for mapping the PDSCH that is a physical channel over which the downlink data is transmitted, in each downlink subframe that constitutes the downlink radio frame. As described above, the UE-specific reference signal is a reference signal for the data demodulation. In order to demodulate the data with high precision, it is desirable that channel characteristics of the reference signal and of the data are consistent with each other or are similar to each other. Accordingly, the transmission is performed using one or several of the radio resources that are used for the data transmission.

Figure 4A:
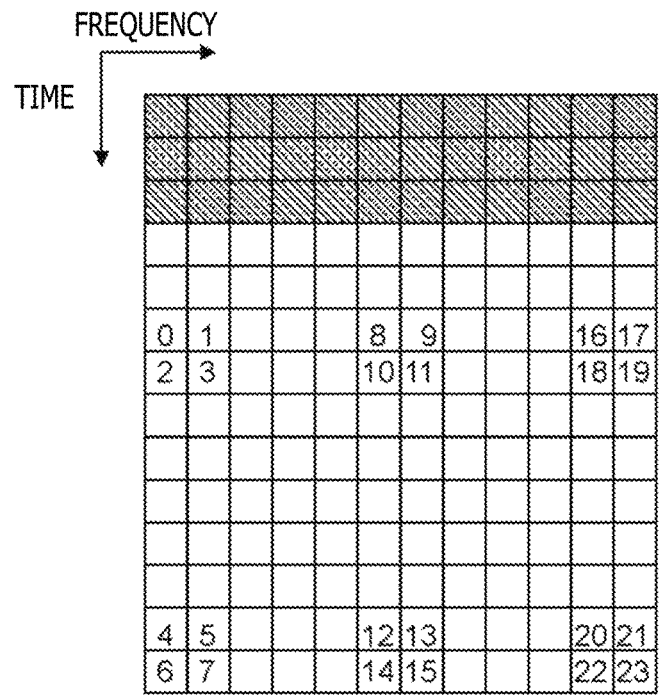
FIGS. 4A and 4B are diagrams illustrating a downlink subframe.
Figure 4B:
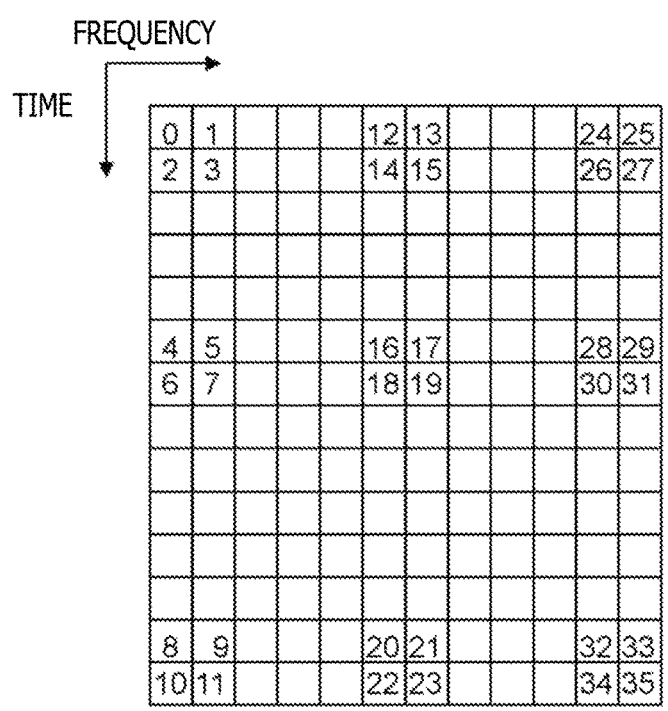

FIGS. 4A and 4B illustrate an example in which the UE-specific reference signal is mapped to the downlink subframe in the LTE. FIG. 4A illustrates an example of arrangement of downlink subframes in the LTE system in the related art. On the other hand, FIG. 4B illustrates an example of arrangement of downlink subframes that have a possibility of being adopted in the LTE system in the related art. Moreover, FIGS. 4A and 4B illustrate a case where one resource block is present (this is equivalent to a case where an amount of resource allocation is minimized) as one example, but it goes without saying that even in a case where multiple resource blocks are present, an enhancement can be easily made.

As illustrated in FIGS. 4A and 4B, each resource block in the downlink subframe is equally divided into 14 pieces in the time axis direction, and is equally divided into 12 pieces in the frequency axis direction. Thus, the resource block is divided into 168 pieces. Each of the 168 resources that result from the division is called a resource element. The resource element is a basic element of modulation. In other words, one resource element corresponds to one symbol in the modulation scheme.

In a subframe in the related art in the LTE system, which is illustrated in FIG. 4A, a region for arranging the control signal is provided in the head of the subframe, that is, in 1 to 3 OFDM symbols. In FIG. 4A, as one example, first to third symbols from the head are a control signal region (an area shown by oblique lines). The downlink data can be arranged in a region (an area that has no oblique lines) other than the control signal region. In the example in FIG. 4A, the downlink data can be arranged in the fourth OFDM symbol and later from the head.

On the other hand, the control signal region is not provided in the subframe that is employed in the future LTE system that is illustrated in FIG. 4B. Accordingly, the data can be arranged in the first OFDM symbol and later from the head, and thus an improvement in data transmission efficiency (throughput) is expected. This is because the downlink subframes in FIG. 4B constitute a broader data region than the downlink subframes in FIG. 4A, and thus a larger amount of data can be transmitted with one subframe. Moreover, it is assumed that the subframe that is illustrated in FIG. 4B does not completely exclude the control signal, for example, with a technique such as an enhanced control signal (an E-PDCCH) or multiframe scheduling, the control signal (the DCI) is caused to be added to the data, but the details of this are omitted here.

In FIGS. 4A and 4B, the UE-specific reference signal is arranged in a region for a downlink data signal. Specifically, in FIG. 4A, the UE-specific reference signal is arranged in resource elements to which numbers from 0 to 23 are sequentially given. On the other hand, in FIG. 4B, the UE-specific reference signal is arranged in resource elements to which numbers from 0 to 35 are sequentially given. The data is not arranged in resource elements in which the UE-specific reference signal is arranged. It can be said that the UE-specific reference signal is transmitted using one or several of the radio resources for data. Accordingly, the receiving side performs the channel estimation using the UE-specific reference signal, and performs the demodulation of the data based on the channel estimation value that is obtained. Moreover, the UE-specific reference signal corresponds to spatial multiplexing transmission of a maximum of 8 space layers in the PDSCH, and 8 orthogonal UE-specific reference signals (reference signals for spatial layers 0 to 7 are distinguished by antenna ports 7 to 14, respectively) each can be multiplexed within a resource block, in such a manner that the channel estimation of each spatial layer is individually performed. Specifically, in an example in FIG. 4A, a reference signal for a spatial layer {0, 1, 4, 6} is code-multiplexed onto resource elements {0, 2, 4, 6, 8, 10, 12, 14, 16, 18, 20, 22} using different orthogonal codes, and a reference signal for a spatial layer {2, 3, 5, 7} is code-multiplexed onto resource elements {1, 3, 5, 7, 9, 11, 13, 15, 17, 19, 21, 23} using different orthogonal codes. For brief description, a case is described below in which within the allocated resource block, PDSCH transmission of one spatial layer is performed and the UE-specific reference signal that is used for demodulation of the one spatial layer is transmitted using the resource elements 0 to 23.

Description is returned to FIG. 1, and processing in S105 is described with reference to the example in FIG. 4A. For example, the radio base station 10 arranges a 0-th phase shift reference signal that is generated in S104, in a 0-th resource element in FIG. 4A. Furthermore, a first phase shift resource element that is generated in S104 is arranged in a first resource element in FIG. 4A. Thereafter, in the same manner, the radio base station 10 can also arrange the phase shift reference signals up to and including a seventh phase shift reference signal.

On the other hand, for example, in the downlink subframe in FIG. 4A, the reference signal (the reference signal that is not phase-shifted) that is generated in S102 can be arranged in 8th to 23rd resource elements. Furthermore, the phase shift reference signals may be set to be arranged in 8th to 15th resource elements and 16th to 23rd resource elements in FIG. 4A, respectively, in the same manner as is the case with the 0-th to 7th resource elements.

Description is returned to FIG. 1, and in S105, in addition to the phase shift reference signal that is generated in S104, the radio base station 10 transmits a data signal that corresponds to the downlink data that occurs in S102. As described above, the phase shift reference signal (or the reference signal) is arranged in an element to which a number is given in a data signal region (an area that has no oblique lines) in the downlink subframe that is illustrated in FIG. 4A or 4B. In contrast, the data signal is arranged in an element to which a number is not given in the data signal region. The data signal that is arranged in the downlink subframe is generated by performing the encoding, the modulation, and the like that are notified in S101 and that are indicated by the MCS, on the downlink data that occurs in S102. Furthermore, the data signal is arranged in the resource block that is indicated by the resource allocation which is notified in S101.

Therefore, in S105, the phase shift reference signal and the downlink data signal are transmitted and received with the same resource block in the same subframe. The phase shift reference signal that is transmitted with the subframe and the same resource block as the downlink data signal is a reference signal that is phase-shifted based on the identifier of the radio terminal 20*a* that is a destination of the downlink data signal. In other words, the phase shift reference signal and the downlink data signal that are transmitted with the same subframe and the same resource block have the same destination.

In the dynamic scheduling in the LTE system in the related art, the control signal (the DCI) is added to the downlink data signal, but the control signal is not added to the downlink data signal that is transmitted in S105 according to the present embodiment. Accordingly, the problem of the decrease in the data transfer efficiency or of the lack of the control signal region, which is described above, can be avoided.

Furthermore, as described above, the transmission of the downlink data in S105 according to the present embodiment can be performed at an arbitrary timing (subframe) after the transmission and reception of the parameters for downlink data in S101. Accordingly, according to the present embodiment, the transmission of the downlink data is not limited to periodic transmission that is based on the period which is determined in advance, such as the SPS in the LTE system in the related art, and for example, it is also possible to perform the transmission of the downlink data over the continuous subframes.

In contrast, in S105 in FIG. 1, the radio terminal 20 receives multiple phase shift reference signals and downlink data signals. The received downlink data signal is temporarily buffered. This is because preparation has to be made for the subsequent demodulation and the like.

Next, in S106, the radio terminal 20 detects a destination of the data based on the phase shift reference signal that is received in S105.

At this point, because the phase shift reference signal that is received by the radio terminal 20*a* in S105 changes based on the channel characteristic (radio quality) between the radio base station 10 and the radio terminal 20, it is noted that the phase shift reference signal is not physically the same as (that is, is different in amplitude or phase from) the phase shift reference signal that is transmitted by the radio base station 10 in S105. Just like this, because the data signal that is received by the radio terminal 20*b* also changes based on the channel characteristic, the data signal is physically different from the data signal that is transmitted by the radio base station 10.

Then, in a general LTE system, the radio terminal 20 receives the reference signal and the data signal, performs estimation (channel estimation) of the channel characteristic based on the received reference signal, and performs the demodulation of the data signal based on the channel estimation value that is obtained there. Accordingly, for example, even if the channel characteristic is poor, and a difference between the transmitted data signal and the received data signal is great, it is possible to suitably demodulate the received data signal.

In the general LTE system, the demodulation of the data signal is performed in this manner based on the reference signal, but in the radio communication system according to the present embodiment, the demodulation of the data signal is performed based on the phase shift reference signal. Furthermore, as described above, in the general LTE system, the destination of the data signal is notified based on the control signal (the DCI) being added to the data signal, but in the radio communication system according to the present embodiment, the destination of the data signal is notified based on the phase shift reference signal being added to the data signal.

Destination detection processing in S106 will be described in detail in due order below.

Figure 5:
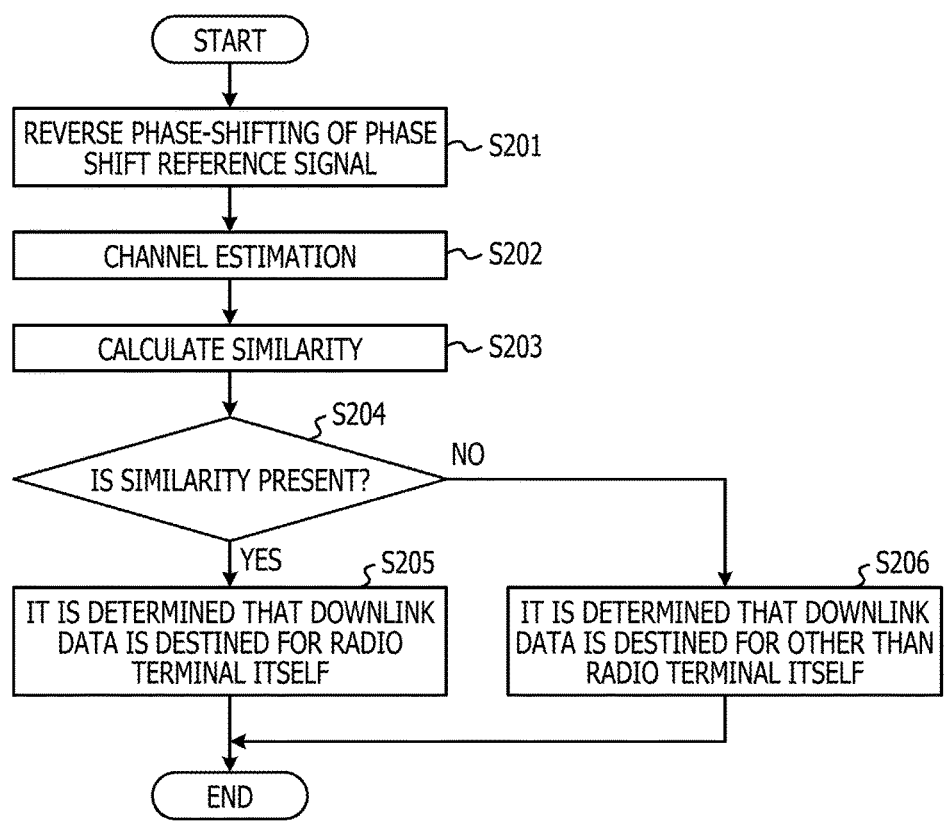
FIG. 5 is a diagram illustrating one example of a processing flow for destination detection according to the first embodiment of the present application.

FIG. 5 illustrates a detailed processing flow for processing in which the radio terminal 20 detects a data destination in S106.

In S201 in FIG. 5, the radio terminal 20 phase-shifts the phase shift reference signal that is received in S105 in FIG. 1. As described above, the radio base station 10 transmits multiple phase shift reference signals that result from phase-shifting the reference signal based on the identifier (RNTI) of the radio terminal, to the radio terminal 20. Based on the identifier of the radio terminal, the radio terminal 20 performs the reverse of the phase shift that is performed by the radio base station 10, on the received phase shift reference signal, and thus obtains a reception signal that corresponds to an original reference signal (a reference signal that has not yet experienced the phase shift).

Processing in S201 in FIG. 5 is described with reference to the specific example described above. Now, a case is considered in which the radio terminal 20 receives 8 phase shift reference signals that is, 0-th to 7th phase shift reference signals. At this time, as the radio base station 10 does in S103 in FIG. 1, the radio terminal 20 divides a 16-bit RNTI that is an identifier of the radio terminal into the 2-bit division RNTIs. The number 2 in the 2 bits is the number of bits that is based on the degree of modulation of QPSK. As described above, RNTI=0001101110011100 of the radio terminal 20 is divided into 8 division RNTIs, that is, 00, 01, 10, 11, 10, 01, 11, and 00. Accordingly, it is possible to convert RNTI into a symbol sequence with a length of 8, in compliance with the QPSK.

In S201, next, the radio terminal 20 phase-shifts the multiple phase shift reference signals that are received in S105, in the direction opposite to the direction in which the radio base station 10 performs the phase shift in S103 in FIG. 1, and thus obtains multiple reference signals. That is, the radio terminal 20 phase-shifts the multiple phase shift reference signals by an amount of phase that corresponds to each symbol which is included in the symbol sequence (which corresponds to the division RNTI) in compliance with the QPSK, which is previously generated, in the opposite direction, and thus generates the reference signals (the reference signals that have not yet experienced the phase shift) of which the number is the same as the length of the symbol sequence. Specifically, the 0-th reference signal is generated by phase-shifting the phase shift reference signal that is received in S105, by the amount of QPSK phase which is equivalent to 00 that is the 0-th division RNTI, that is, by 225°, in the opposite direction (the phase-shifting by 225° in the opposite direction is the same as the phase-shifting by −225°). The 1st reference signal is generated by phase-shifting the phase shift reference signal that is received in S105, by the amount of QPSK phase which is equivalent to 01 that is the 1st division RNTI, that is, by 135°, in the opposite direction (the phase-shifting by 135° in the opposite direction is the same as the phase-shifting by −135°). Thereafter, in the same manner, the radio terminal 20 can also generate the reference signals up to and including the 7th reference signal.

Next, in S202 in FIG. 5, the radio terminal 20 performs the channel estimation based on each of the multiple reference signals that are obtained in S201. Accordingly, the radio terminal 20 can obtain multiple channel estimation values. In the specific example described above, the radio terminal 20 performs the channel estimation individually based on each of the 8 reference signals that are obtained in S201, and obtains 8 channel estimation values. At this point, the channel estimation value is a physical quantity indicating the channel characteristic, and can be expressed with a point (a vector) on the I-Q plane. Furthermore, the channel estimation value can be expressed with a set of an amplitude and a phase. Because the channel estimation can be performed based on an arbitrary technique in the related art, a description thereof is omitted here.

Then, in S203 in FIG. 5, the radio terminal 20 obtains a degree of similarity of the multiple channel estimation values that are obtained in S202. At this point, any arbitrary degree of similarity that is the physical quantity indicating the degree to which the multiple channel estimation values are similar to each other can be used. In the specific example described above, the degree of similarity of the 8 channel estimation values that are obtained in S202 is obtained.

As one example of the degree of similarity, inner product values of the multiple channel estimation values can be used. N channel estimation values that are obtained in S202 are expressed as $h_0$ to $h_{N-1}$, respectively, and inner product values IP of these are expressed as in Equation (1).

$$IP = \frac{1}{N-1} \sum_{n=0}^{N-2} h_n \cdot h_{n-1} \qquad (1)$$

As another example of the degree of similarity, the use of variance of the channel estimation values is considered. A variance Var of the channel estimation values is expressed as in Equation (2).

$$\text{Var} = \frac{1}{N} \sum_{n=0}^{N-1} |h_n - h_{ave}|^2 \cdot h_{ave} = \frac{1}{N} \sum_{n=0}^{N-1} h_n \qquad (2)$$

Alternatively, as another example of the degree of similarity, a maximum phase difference between the multiple channel estimation values may be set to be used. At this point, the maximum phase difference between the multiple channel estimation values can also be referred to as a size of a phase range of the multiple channel estimation values. For example, in a case where the multiple channel estimation values are all the same, the maximum phase difference is 0°. Furthermore, phases of the multiple channel estimation values fall into a range from 20° to 140°, the maximum phase difference is 120°. Moreover, in addition to the maximum phase difference between the multiple channel estimation values, the degree of similarity may also be set to be obtained by combining ranges of amplitudes of the multiple channel estimation values.

Next, in S204, the radio terminal 20 determines whether or not the multiple channel estimation values are similar to each other, based on the degree of similarity that is obtained in S203. For example, this is performed as follows.

For example, in a case where the inner product value is used as the degree of similarity of the multiple channel estimation values, when the inner product value is greater than a predetermined value, it can be determined that the multiple channel estimation values are similar to each other. On the other hand, in a case where the inner product value is equal to or smaller than the predetermined value, it can be determined that the multiple channel estimation values are not similar to each other. Furthermore, for example, in a case where the variance is used as the degree of similarity of the multiple channel estimation values, when the variance is smaller than a predetermined value, it can be determined that the multiple channel estimation values are similar to each other. On the other hand, in a case where the variance is equal to or greater than the predetermined value, it can be determined that the multiple channel estimation values are not similar to each other.

In addition, for example, in a case where the maximum phase difference of each channel estimation value is used as the degree of similarity of the multiple channel estimation values, when the maximum phase difference is smaller than a predetermined value, it can be determined that the multiple channel estimation values are similar to each other. On the other hand, in a case where the maximum phase difference is equal to or greater than the predetermined value, it can be determined that the multiple channel estimation values are not similar to each other. In a case where the degree of similarity that is based on the maximum phase difference is used, a predetermined value that distinguishes between the similarity and the non-similarity may be set to be determined based on a phase difference between signal points in compliance with the modulation scheme. For example, in a case where the QPSK is used as the modulation scheme, because the phase difference between the signal points in compliance with the QPSK is 90°, a predetermined value here can be set to be 90°.

In a case where it is determined in S204 that the multiple channel estimation values are similar to each other (Yes), the radio terminal 20 proceeds to S205. In this case, in S205, the radio terminal 20 (which, in this case, is the radio terminal 20a in FIG. 1) determines that the downlink data which is received in S105 in FIG. 1 is destined for the radio terminal 20 itself. On the other hand, in a case where it is determined in S204 that the multiple channel estimation values are not similar to each other (No), the radio terminal 20 (which, in this case, is the radio terminal 20b in FIG. 1) proceeds to S206. In this case, in S206, the radio terminal 20 determines that the downlink data that is received in S105 in FIG. 1 is destined for other than the radio terminal 20 itself.

A concept of the destination detection that is based on the phase shift reference signal described above is described referring to FIGS. 6A and 6B. Now, a case will be described in which a phase shift reference signal that is destined for a first radio terminal 20 that is a certain radio terminal 20 is received by the first radio terminal 20. In this case, in destination detection processing by the first radio terminal 20, the phase shift reference signal, which is phase-shifted by the radio base station 10 based on an identifier of the first radio terminal 20, is phase-shifted in the direction opposite to the direction in which the phase shift reference signal is phase-shifted in the radio base station 10, based on the identifier of the first radio terminal 20. Accordingly, the reference signal that is phase-shifted by the radio base station 10 is caused by the radio terminal 20 to return to its original state. Therefore, in this case, the multiple reference signals that are obtained after the phase shift in the destination detection processing are similar to each other. With reference to the specific example described above, as illustrated in FIG. 6A, the reference signals that are obtained by the 8 phase shift reference signals are comparatively near each other in phase shift and are similar to each other. Therefore, in this case, in S204, it is determined that the similarity is present (Yes), and in S205, it is determined that the downlink data is destined for the radio terminal 20 itself.

On the other hand, a case is considered in which the phase shift reference signal of the first radio terminal 20 that is a certain radio terminal 20 is received by a second radio terminal 20 which is different from the first radio terminal 20. In this case, in the destination detection processing by the second radio terminal 20, the phase shift reference signal, which is phase-shifted by the radio base station 10 based on the identifier of the first radio terminal 20, is phase-shifted in the direction opposite to the direction in which the phase shift reference signal is phase-shifted in the radio base station 10, based on an identifier of the second radio terminal 20. At this time, the reference signal that is phase-shifted by the radio base station 10 is not caused by the radio terminal 20 to return to its original state (a case where the phase-shifted reference signal returns by accident to its original state is excluded). Therefore, in this case, the multiple reference signals that are obtained after the phase shift in the destination detection processing are not similar to each other. With reference to the specific example described above, as illustrated in FIG. 6B, the reference signals that are obtained by the 8 phase shift reference signals vary in phase shift and are not similar to each other. Therefore, in this case, in S204, it is determined that the similarity is not present (No), and in S206, it is determined that the downlink data is destined for other than the radio terminal 20 itself.

Figure 6A:
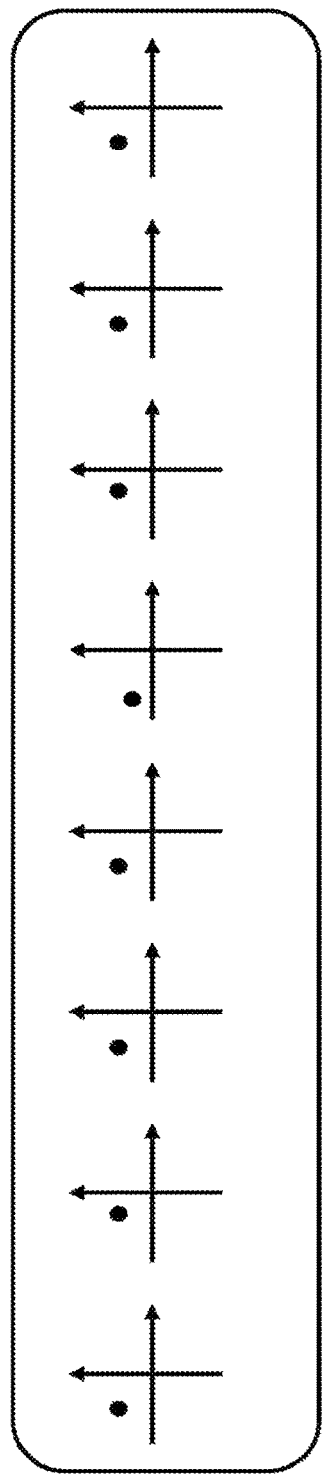
FIGS. 6A and 6B are diagrams for describing a concept of the destination detection according to the first embodiment of the present application.
Figure 6B:
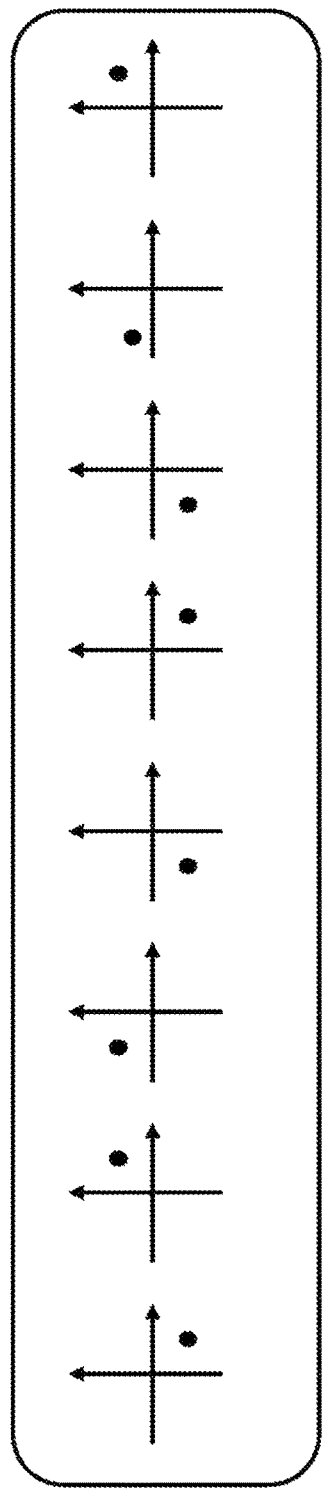

The reason that the multiple reference signals that are illustrated in FIG. 6A are not completely consistent with each other is because the channel characteristic between each of the multiple phase shift reference signals that are sources of the reference signal is not necessarily the same. For example, as illustrated in FIG. 4A, the 8 phase shift reference signals are arranged in the 0-th to 7th resource elements, respectively. At this point, the 0-th, 2nd, 4th, and 6th resource elements and the 1st, 3rd, 5th, and 7th resource elements have small but different frequency components. Furthermore, the 0-th and 1st, 2nd and 3rd, 4th and 5th, and 6th and 7th resource elements have different time components. Particularly, a time difference corresponding to 5 resource elements is present between the 0-th to 3rd resource elements and the 4th to 7th resource elements. Due to these differences between the frequency components and between the time components, the channel characteristic between each of the multiple phase shift reference signals is not necessarily the same, and accordingly, the multiple phase shift reference signals are not completely consistent with each other in FIG. 6A.

However, a difference in frequency component between each of the 0-th to 7th resource elements that are illustrated in FIG. 6A is small, and a difference in time component also amounts to approximately one subframe. In this manner, in a case where differences in frequency component and in time component between the multiple resource elements in which the phase shift reference signal is arranged are small, it is considered that a difference in channel characteristic between each of the multiple phase shift reference signals is also small. Accordingly, when multiple reference signals are generated based on multiple phase shift reference signals, it is considered that there is a high possibility that the multiple phase shift reference signals will be similar to each other (for example, FIG. 6A).

Particularly, it is assumed that the MTC device described above, such as an electric meter, is not on the move or moves a short distance (is in a semi-stationary state). Consequently, it is considered that a change in channel characteristic over time is exceedingly small when compared with the radio terminal 20 that is moved at a high speed. Therefore, there is a slight time difference between each of the 0-th to 7th resource elements that are illustrated in FIG. 6A, but it is considered that this is almost not problematic particularly in the MTC device and the like.

Therefore, the multiple reference signals, as illustrated in FIG. 6A, are not completely consistent with each other, but it is considered that on the several assumptions described above, there is a high possibility that these will be sufficiently similar to each other. Therefore, it is considered that the precision of the destination detection according to the present embodiment is sufficiently secured (the erroneous detection is sufficiently rare).

Referring back to FIG. 1, in S106, the radio terminal 20 performs destination determination processing as described referring to FIG. 5 and the like. In the example in FIG. 1, the radio terminal 20a determines that the downlink data is destined for the radio terminal 20a itself. On the other hand, the radio terminal 20b determines that the downlink data is destined for other than the radio terminal 20b.

In a case where it is determined in S106 that the downlink data is destined for the radio terminal 20 itself, in S107, the radio terminal 20 demodulates and decodes the downlink data that is buffered after being received in S105. Accordingly, the radio terminal 20 can obtain the downlink data. Moreover, as demodulation and decoding schemes at this time, the demodulation and decoding schemes that are indicated by the MCS which is notified in S101 in FIG. 1 are used. Furthermore, the demodulation is performed using the channel estimation value that is obtained in S202. Because demodulation and decoding processing is only one in the related art, a detailed description thereof is omitted here.

On the other hand, in a case where it is determined in S106 that the downlink data is destined for other than the radio terminal 20 itself, the radio terminal 20 does not perform the demodulation and decoding of the downlink data that is buffered after being received in S105. In this case, the data that is buffered after being received in S105 may be set to be deleted (flashed).

According to the first embodiment described above, an effect is achieved in which the receiving side can detect a transmission destination (a destination) based on the phase shift reference signal by using the phase shift reference signal that results from phase-shifting the reference signal according to the identifier of the receiving side (the radio terminal 20). Accordingly, the problems with the reference scheme, which are described, can be solved. Furthermore, according to the first embodiment, because there is no desire to cause the control signal to be added to the data signal, the decrease in the data transfer efficiency and the lack of the control signal region is avoided by removing the control signal. In addition, according to the first embodiment, it is possible to perform the data transmission at an arbitrary timing without being limited to periodic transmission such as the SPS described above.

Second Embodiment

According to the first embodiment, the phase modulation such the QPSK is used as the modulation scheme. In contrast, according to a second embodiment, a modulation scheme other than the phase modulation is used.

Basic portions according to the second embodiment, such as a processing sequence, are the same as those according to the first embodiment, which are described referring to FIGS. 1, 4, and 5. Furthermore, most of the processing operations according to the second embodiment remain the same as, or similar to those according to the first embodiment. Accordingly, what distinguishes the second embodiment from the first embodiment will be briefly described below in a focused manner.

Here, as a modulation scheme other than the phase modulation, 16 quadrature amplitude modulation (QAM) that is orthogonal amplitude modulation is used. According to the second embodiment, as the modulation scheme other than the phase modulation, 64 QAM that is orthogonal amplitude modulation, amplitude modulation, or the like can be used.

Figure 7:
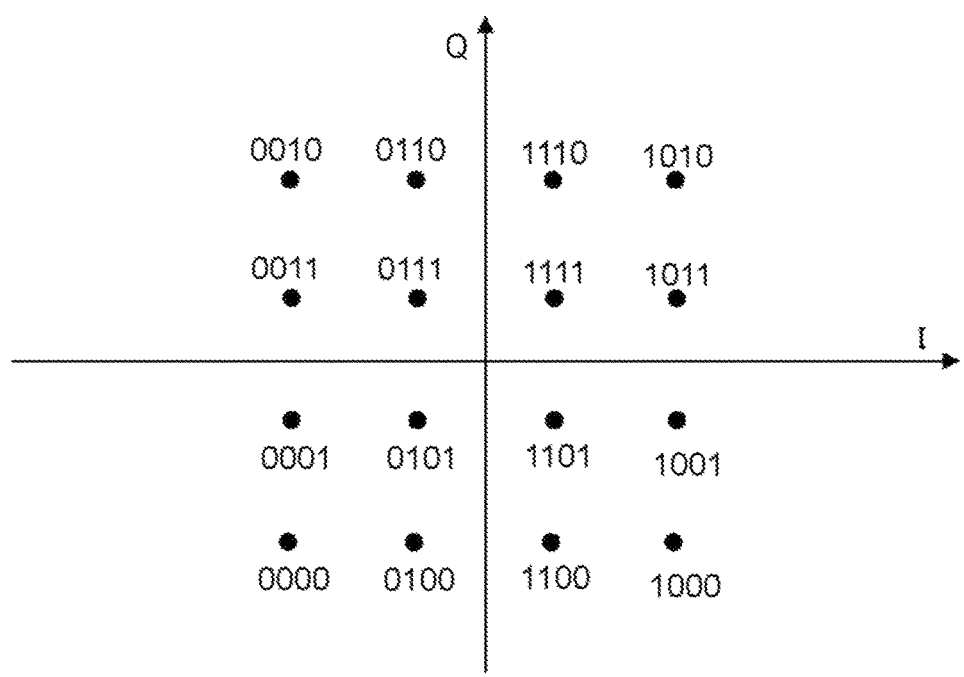
FIG. 7 is a diagram for describing an orthogonal amplitude modulation scheme.

FIG. 7 is a diagram illustrating the 16 QAM on the I-Q plane. The degree of modulation of the 16 QAM is 4 ($=\log_2 16$). In other words, the 16 QAM is a modulation scheme by which 4-bit information can be transferred with one symbol. In other words, each symbol in compliance with the 16 QAM is information for 4 bits, and 16 types of states can be obtained. These 16 types of states are expressed with 16 signal points on the I-Q plane that are illustrated in FIG. 7. 16 signal points in compliance with the 16 QAM are values which can be obtained using four bits, and correspond to 0000, 0001, 0010, 0011, 0100, 0101, 0110, 0111, 1000, 1001, 1010, 1011, 1100, 1101, 1110, and 1111, respectively.

The 16 signal points in compliance with the 16 QAM that are illustrated in FIG. 7 are different not only in phase, but also in amplitude. Therefore, according to the second embodiment, in a case where the phase shift reference signal is generated from the reference signal in S104 in FIG. 1, the radio base station 10 changes not only the phase of, but also the amplitude of the reference signal, based on the identifier (RNTI) of the radio terminal. On the other hand, in a case where the reference signal is generated from the phase shift reference signal in S201 in FIG. 5, the radio terminal 20 changes not only the phase of, but also the amplitude, of the reference signal, in the direction opposite to the direction in which the radio base station 10 changes the phase and amplitude of the reference signal, based on the identifier (RNTI) of the radio terminal.

A detailed description is provided referring to FIG. 7. In FIG. 7, the points are arranged to be equally spaced. At this point, when average power of each signal point is set to be 1, amplitude in a case where 16 QAM symbols are 1111 and the like is $1/\sqrt{5}$, amplitude in a case where the 16 QAM symbols are 1011 and the like is 1, and amplitude in a case where the 16 QAM symbols are 1010 and the like is $3/\sqrt{5}$. Then, for example, in a case where a certain division RNTI is 1011, the radio base station 10 phase-shifts the reference signal and then multiplies the result by one, and thus generates the phase shift reference signal. In this case, the radio terminal 20 can obtain the reference signal by multiplying the phase shift reference signal by one. Furthermore, in a case where a certain division RNTI is 10, the radio base station 10 phase-shifts the reference signal and then multiplies the amplitude by $3/\sqrt{5}$, and thus generates the phase shift reference signal. In this case, the radio terminal 20 can obtain the reference signal by multiplying the phase shift reference signal by $\sqrt{5}/3$.

According to the second embodiment, the same effect as that according to the first embodiment can also be achieved.

Third Embodiment

According to the first embodiment, the phase shift reference signal is generated from the reference signal, using the phase modulation, such as the QPSK, as the modulation scheme. In contrast, according to a third embodiment, the phase shift reference signal is obtained by reversing the reference signal on the I-Q plane.

Basic portions according to the third embodiment, such as a processing sequence, are the same as those according to the first embodiment, which are described referring to FIGS. 1, 4, and 5. Furthermore, most of the processing operations according to the third embodiment remain the same as, or similar to those according to the first embodiment. Accordingly, what distinguishes the third embodiment from the first embodiment will be briefly described below in a focused manner.

According to the third embodiment, in the case where the phase shift reference signal is generated from the reference signal in S104 in FIG. 1, the radio base station 10 reverses the reference signal on the I-Q plane, based on the identifier (RNTI) of the radio terminal. If a case where the division RNTI is 2 bits is described as an example, in a case where the division RNTI is 00, the phase shift reference signal is generated without reversing any of a polarity of an I component and a polarity of a Q component, and in a case where the division RNTI is 01, the phase shift reference signal is generated by reversing only the polarity of the Q component. Furthermore, in a case of 10, the phase shift reference signal is generated by reversing only the polarity of the I component, and in a case of 11, the phase shift reference signal is generated by any of the polarity of the I component and the polarity of the Q component. On the other hand, in a case where the reference signal is generated from the phase shift reference signal in S201 in FIG. 2, the radio terminal 20 reverses the phase shift reference signal on the I-Q plane as the base station does based on the identifier (RNTI) of the radio terminal 20. Accordingly, because the same reserving is performed in the radio base station 10 and the radio terminal 20 that is a destination, an original reference signal can be obtained in the radio terminal that is the destination.

According to the third embodiment, the same effect as that according to the first embodiment can also be achieved.

[Network Configuration of a Radio Communication System According to Each of the Embodiments]

Figure 8:
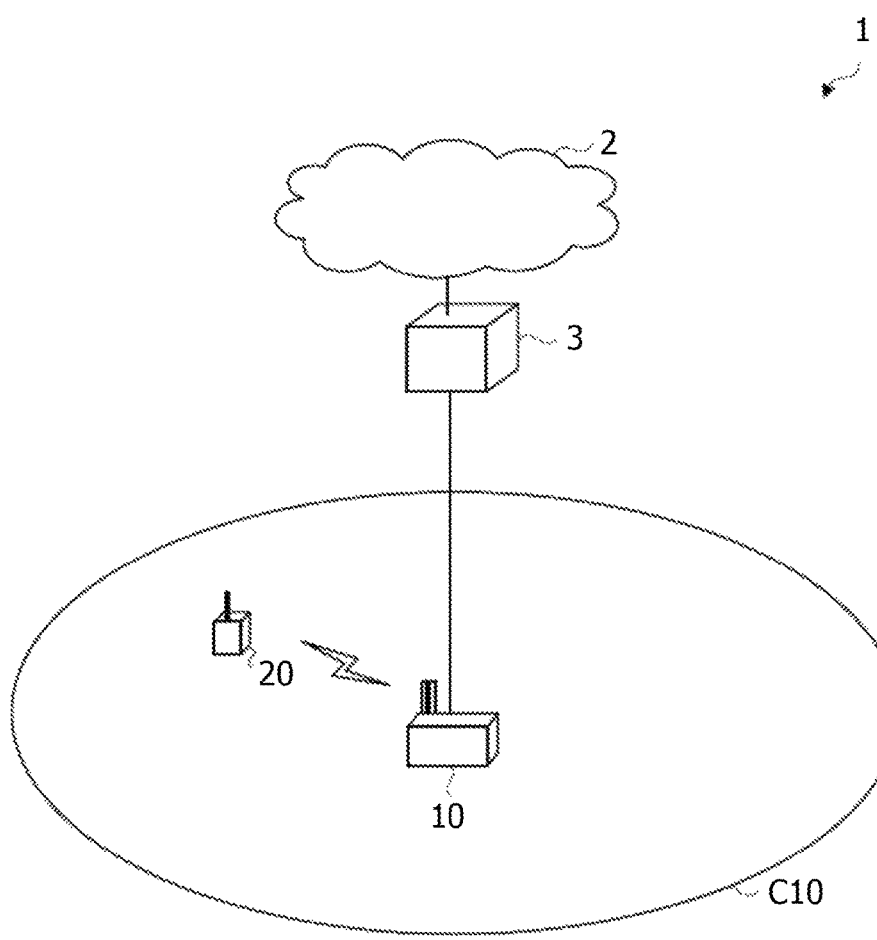
FIG. 8 is a diagram illustrating one example of a network configuration of a radio communication system according to each embodiment.

Next, a network configuration of a radio communication system 1 according to each of the embodiments is described referring to FIG. 8. As illustrated in FIG. 8, the radio communication system 1 has the radio base station 10 and the radio terminal 20. The radio base station 10 forms a cell C10. The radio terminal 20 is present within the cell C10. Moreover, it is noted that in the present application, the radio base station 10 is referred to as a "transmission station," and the radio terminal 20 is referred to as a "reception station."

The radio base station 10 is coupled to a network device 3 through a wired connection, and the network device 3 is coupled to a network 2 through the wired connection. The radio base station 10 is provided in such a manner as to transmit and receive data or control information to and from a different radio base station through the network device 3 and the network 2.

The radio base station 10 may be made up of separate devices. One has a function of performing radio communication with the radio terminal 20, and the other has a function of performing digital signal processing and a control function. In this case, the device equipped with the radio communication function is referred to as a remote radio head (RRH), and the device equipped with the digital signal processing and the control function is referred to as a base band unit (BBU). The RRH may be installed in a state of protruding from the BBU, and an optical fiber and the like may provide a connection between the RRH and the BBU in the wired manner. Furthermore, the radio base stations 10 may include not only a macro radio base station and small-sized radio base stations (including a micro radio base station, a femto radio base station, and the like), such as a pico radio base station, but also variously-sized radio base stations. Furthermore, in a case where a relay station is used that relays the radio communication between the radio base station 10 and the radio terminal 20, the relay station (transmission to and reception from the radio terminal 20 and control of the transmission and reception) also may be set to be included in the radio base station 10 in the present application.

On the other hand, the radio terminal 20 performs the communication with the radio base station 10 using the radio communication.

The radio terminal 20 may be a radio terminal, such as a portable telephone, a smartphone, a personal digital assistant (PDA), a personal computer, or an apparatus or device (sensing device or the like) having a radio communication function. Furthermore, in the case where the relay station is used that relays the radio communication between the radio base station 10 and the radio terminal, the relay station (transmission to and reception from the radio base station 10 and control of the transmission and reception) also may be set to be included in the radio terminal 20 in the present application.

The network device 3, for example, includes a communication section and a control section. Constituent elements such as these are coupled to one another in such a manner that it is possible to input and output a signal or data in a one-way direction or in a two-way direction. The network device 3, for example, is realized by a gateway. As a hardware configuration of the network device 3, for example, the communication section is realized as an interface circuit, and the control section is realized as a processor and a memory.

Moreover, specific aspects of distribution or integration of constituent elements of the radio base station and the radio terminal are not limited to aspects of the first embodiment. A configuration can be provided in which all or some of the constituent elements are distributed or integrated functionally or physically in arbitrary units according to various loads, an operating condition, or the like. For example, a connection to the memory as an external device of each of the radio base station and the radio terminal may be established through a network or a cable.

[Functional Configuration of Each Device in the Radio Communication System According to Each of the Embodiments]

Figure 9:
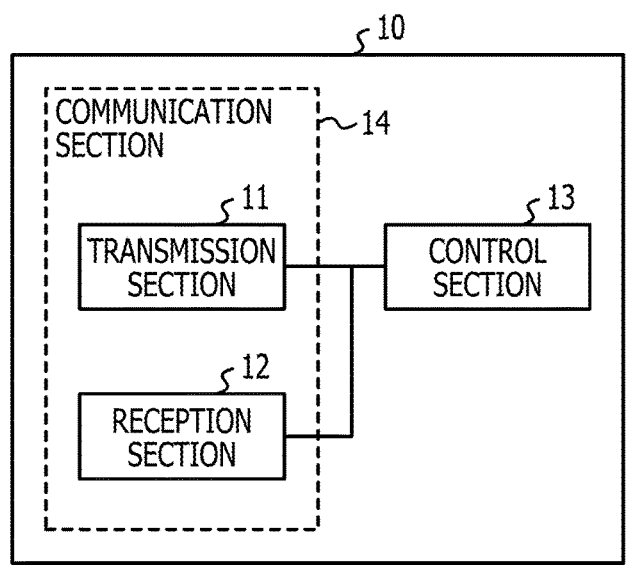
FIG. 9 is one example of a functional configuration diagram of a radio base station in the radio communication system according to each embodiment.
Figure 10:
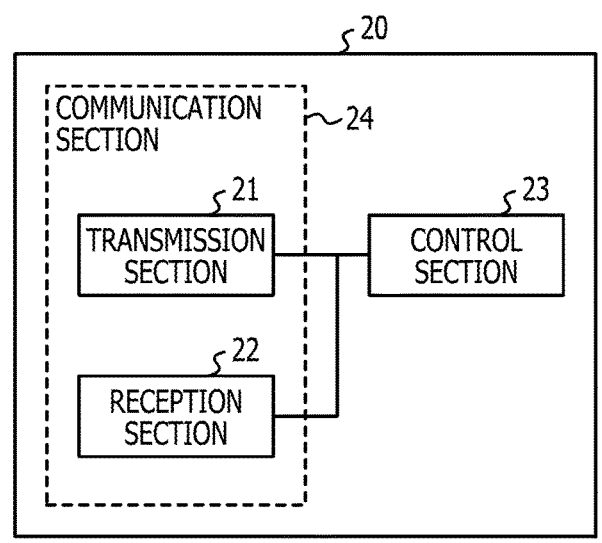
FIG. 10 is one example of a functional configuration diagram of a portable phone terminal in the radio communication system according to each embodiment.

Next, referring to FIGS. 9 and 10, a functional configuration of each device in the radio communication system according to each of the embodiments is described.

FIG. 9 is a functional block diagram illustrating a configuration of the radio base station 10. As illustrated in FIG. 9, the radio base station 10 includes a transmission section 11, a reception section 12, and a control section 13. These constituent components are coupled to one another in such a manner that it is possible to input and output a signal or data in a one-way direction or in a two-way direction.

Moreover, the transmission section 11 and the reception section 12 are collectively referred to as a communication section 14.

The transmission section 11 transmits a data signal or a control signal through an antenna using the radio communication. Moreover, the antenna may be shared for transmission and reception. The transmission section 11, for example, transmits a downlink signal through a downlink data channel or a control channel. The downlink data channels, for example, include a physical downlink shared channel (PDSCH). Furthermore, downlink control channels, for example, include a physical downlink control channel (PDCCH). Signals that are transmitted, for example, include an L1/L2 control signal that is transferred to the radio terminal 20 in a coupled state on a control channel, a user data signal that is transferred to the radio terminal 20 in the coupled state on a data channel, or a radio resource control (RRC) control signal. Furthermore, the signals that are transmitted, for example, include a reference signal that is used for the channel estimation or the demodulation.

As a specific example of the signal that is transmitted by the transmission section 11, each signal that is transmitted by each radio base station 10 that is illustrated in FIG. 1 is given. Specifically, the transmission section 11 can transmit the parameters for downlink data, the phase shift reference signal, and the downlink data, which are illustrated in FIG. 1. The signal that is transmitted by the transmission section 11 is not limited to these, and include all signals that are transmitted by the radio base station 10 according to each of the embodiments described above and a modification example.

The reception section 12 receives the data signal or the control signal that is transmitted from the radio terminal 20 using first radio communication through the antenna. The reception section 12 receives an uplink signal, for example, through an uplink data channel or a control channel. The uplink data channels, for example, include a physical uplink shared channel (PUSCH). Furthermore, uplink control channels, for example, include a physical uplink control channel (PUCCH). Signals that are received, for example, include the L1/L2 control signal that is transferred from the radio terminal 20 in the coupled state on the control channel, the user data signal that is transferred from the radio terminal 20 in the coupled state on the data channel, or the radio resource control (RRC) control signal. Furthermore, the signals that are received, for example, include the reference signal that is used for the channel estimation or the demodulation.

The signals that are received by the reception section 12 include all signals that are received by the radio base station 10 according to each of the embodiments described above and a modification example.

The control section 13 outputs data or control information that is transmitted, to the transmission section 11. The control section 13 inputs the data or the control information that is received, from the reception section 12. The control section 13 acquires the data or the control information from the network device 3 or the radio base station through the wired connection or the wireless connection. In addition to these, the control section performs various control operations relating to various transmission signals that are transmitted by the transmission section 11, or to various reception signals that are received by the reception section 12.

As a specific example of processing that is controlled by the control section 13, processing operations that are performed by the radio base station 10 that is illustrated in FIG. 1 are given. The processing that are controlled by the control section 13 is not limited to these processing operations, and include all processing operations that are performed by the radio base station 10 according to each of the embodiments described above and the modification example.

FIG. 10 is a functional block diagram illustrating a configuration of the radio terminal 20. As illustrated in FIG. 10, the radio terminal 20 includes a transmission section 21, a reception section 22, and a control section 23. These constituent components are coupled to one another in such a manner that it is possible to input and output a signal or data in a one-way direction or in a two-way direction. Moreover, the transmission section 21 and the reception section 22 are collectively referred to as a communication section 24.

The transmission section 21 transmits a data signal or a control signal through an antenna using the radio communication. Moreover, the antenna may be shared for transmission and reception. The transmission section 21 transmits the uplink signal, for example, through the uplink data channel or the control channel. The uplink data channels, for example, include a physical uplink shared channel (PUSCH). Furthermore, uplink control channels, for example, include a physical uplink control channel (PUCCH). The signals that are transmitted, for example, include the L1/L2 control signal that is transferred to the radio base station 10 that makes a connection, on a control channel, the user data signal that is transferred to the radio base station 10 that makes a connection, on the data channel, or the radio resource control (RRC) control signal. Furthermore, the signals that are transmitted, for example, include a reference signal that is used for the channel estimation or the demodulation.

The signal that is transmitted by the transmission section 21 includes all signals that are transmitted by the radio terminal 20 according to each of the embodiments described above and the modification example.

The reception section 22 receives the data signal or the control signal that is transmitted from the radio base station 10 using the radio communication through the antenna. The reception section 22 receives the downlink signal, for example, through the downlink data channel or the control channel. The downlink data channels, for example, include a physical downlink shared channel (PDSCH). Furthermore, downlink control channels, for example, include a physical downlink control channel (PDCCH). The signals that are received, for example, include the L1/L2 control signal that is transferred from the radio base station 10 that makes a connection, on the control channel, the user data signal that is transferred from the radio base station 10 that makes a connection, on the data channel, or the radio resource control (RRC) control signal. Furthermore, the signals that are received, for example, include the reference signal that is used for the channel estimation or the demodulation.

As a specific example of the signal that is received by the reception section 22, each signal that is received by the radio terminal 20 that is illustrated in FIG. 1 is given. Specifically, the reception section 22 can receive the parameters for downlink data, the phase shift reference signal, and the downlink data, which are illustrated in FIG. 1. The signal that is received by the reception section 22 is not limited to these, and include all signals that are received by the radio terminal 20 according to each of the embodiments described above and the modification example.

The control section 23 outputs data or control information that is transmitted, to the transmission section 21. The control section 23 inputs the data or the control information that is received, from the reception section 22. The control section 23 acquires the data or the control information from the network device 3 or a different radio base station through the wired connection or the wireless connection. In addition to these, the control section performs various control operations relating to various transmission signals that are transmitted by the transmission section 21, or various reception signals that are received by the reception section 22.

As a specific example of the processing that is controlled by the control section 23, processing operations that are performed by the radio terminal 20 that is illustrated in FIGS. 1 and 5 are given. The processing operations that are controlled by the control section 23 are not limited to these, and include all processing operations that are performed by the radio terminal 20 according to each of the embodiments described above and the modification example.

[Hardware Configuration of Each Device in the Radio Communication System According to Each of the Embodiments]

Figure 11:
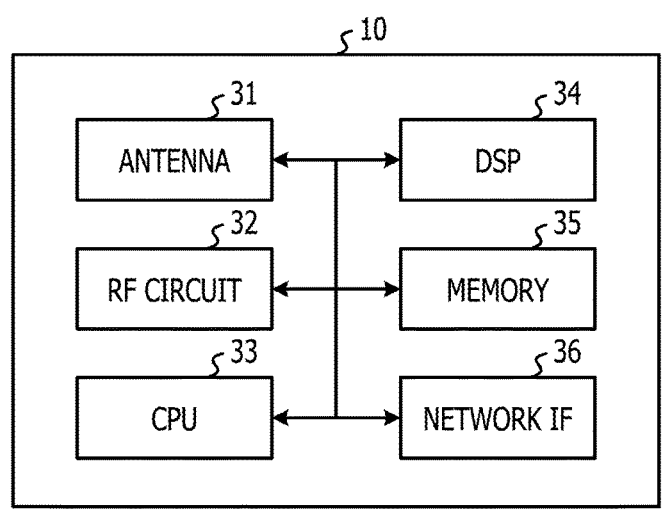
FIG. 11 is one example of a hardware configuration diagram of the radio base station in the radio communication system according to each embodiment.
Figure 12:
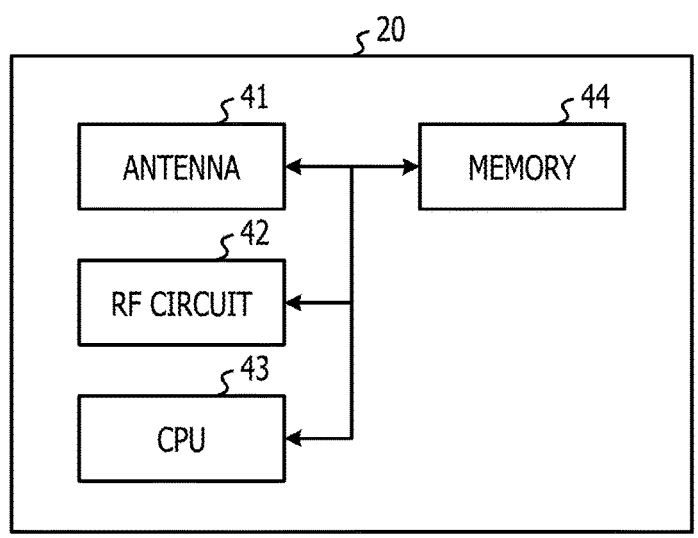
FIG. 12 is one example of a hardware configuration diagram of the portable phone terminal in the radio communication system according to each embodiment.

Referring to FIGS. 11 and 12, a hardware configuration of each device in the radio communication system according to each of the embodiments and each of the modification examples will be described.

FIG. 11 is a diagram illustrating a hardware configuration of the radio base station 10. As illustrated in FIG. 11, the radio base station 10 includes a radio frequency (RF) circuit 32 including, for example, an antenna 31, a central processing unit (CPU) 33, a digital signal processor (DSP) 34, a memory 35, and a network interface (IF) 36, as hardware constituent elements. The CPU is coupled in such a manner that it is possible to input and output various signals or data through a bus. The memory 35 includes at least any one of a random access memory (RAM), for example, such as a synchronous dynamic random access memory (SDRAM), a read only memory (ROM), and a flash memory. A program, control information, or data is stored in the memory 35.

A correspondence between a functional configuration of the radio base station 10 that is illustrated in FIG. 9 and a hardware configuration of the radio base station 10 that is illustrated in FIG. 11 is described. The transmission section 11 and the reception section 12 (or the communication section 14), for example, are realized by the RF circuit 32, or the antenna 31 and the RF circuit 32. The control section 13, for example, is realized by the CPU 33, the DSP 34, the memory 35, a digital electronic circuit that is not illustrated, and the like. For example, as the digital electronic circuit, for example, an application-specific integrated circuit (ASIC), a field-programming gate array (FPGA), a large scale integration (LSI), and the like are given.

FIG. 12 is a diagram illustrating a hardware configuration of the radio terminal 20. As illustrated in FIG. 12, the radio terminal 20 includes an RF circuit 42 including, for example, an antenna 41, a CPU 43, and a memory 44, as hardware constituent elements. Additionally, the radio terminal 20 may include a display device, such as a liquid crystal display (LCD), which is coupled to the CPU 43. The memory 44 includes at least any one of a RAM, for example, such as an SDRAM, a ROM, and a flash memory. A program, control information, or data is stored in the memory 44.

A correspondence between a functional configuration of the radio terminal 20 that is illustrated in FIG. 10 and a hardware configuration of the radio terminal 20 that is illustrated in FIG. 12 is described. The transmission section 21 and the reception section 22 (or the communication section 24), for example, are realized by an RF circuit 42, or an antenna 41 and the RF circuit 42. The control section 23, for example, is realized by the CPU 43, the memory 44, a digital electronic circuit that is not illustrated, and the like.

As the digital electronic circuit, for example, an ASIC, an FPGA, an LSI, and the like are given.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission device comprising:
a memory; and
a processor coupled to the memory and configured to:
phase modulate a known signal based on identification information of a reception device to generate a second signal;
when data is transmitted to the reception device, transmit a first signal and the second signal to the reception device, the first signal including the data, wherein the second signal is used by the reception device to perform a phase demodulation on the second signal to generate a third signal; and
determine, based on a comparison of the third signal and the known signal used for generating the second signal, that the data included in the first signal is destined for the reception device.

2. The transmission device according to claim 1, wherein a control signal indicating the identification information is not added to the first signal.

3. The transmission device according to claim 1, wherein the first signal is transmitted with an arbitrary transmission unit among transmission units that are continuously set up on a time axis.

4. The transmission device according to claim 1, wherein the second signal is transmitted over a frequency within a first predetermined range and over a time within a second predetermined range.

5. The transmission device according to claim 1, wherein the known signal is a signal that is used for demodulation of the first signal by the reception device that is a destination.

6. The transmission device according to claim 1, wherein the second signal is used by the reception device for determining that the first signal is destined for the reception device.

7. A reception device comprising:
a memory; and
a processor coupled to the memory and configured to:
receive a first signal and a second signal;
perform phase demodulation, based on identification information for the reception device, on the second signal to generate a third signal; and
determine that data included in the first signal is destined for the reception device, wherein said determining is based on a comparison of the third signal and a known signal used for generating the second signal.

8. The reception device according to claim 7, wherein a control signal indicating the identification information is not added to the first signal.

9. The reception device according to claim 7, wherein the first signal is received with an arbitrary transmission unit among transmission units that are continuously set up on a time axis.

10. The reception device according to claim 7, wherein the second signal is transmitted over a frequency within a first predetermined range and over a time within a second predetermined range.

11. The reception device according to claim 7, wherein the known signal is a signal that is used for demodulation of the first signal by the reception device.

12. A transmission method comprising:
   phase modulating a known signal based on identification information of a reception device to generate a second signal; and
   transmitting, when data is transmitted to the reception device, a first signal and the second signal to the reception device, the first signal including the data, wherein the second signal is used by the reception device to perform a phase demodulation on the second signal to generate a third signal, and to determine, based on a comparison of the third signal and the known signal used for generating the second signal, that the data included in the first signal is destined for the reception device.

13. The transmission method according to claim 12, wherein the second signal is used by the reception device for determining that the first signal is destined for the reception device.

14. A reception method comprising:
   receiving a first signal and a second signal;
   performing phase demodulation, based on identification information for a reception device, on the second signal to generate a third signal; and
   determining that data included in the first signal is destined for the reception device, wherein said determining is based on a comparison of the third signal and a known signal used for generating the second signal.

* * * * *